United States Patent
Yang et al.

(10) Patent No.: US 10,019,809 B2
(45) Date of Patent: Jul. 10, 2018

(54) UNDERWATER 3D IMAGE RECONSTRUCTION UTILIZING TRIPLE WAVELENGTH DISPERSION AND CAMERA SYSTEM THEREOF

(71) Applicant: The Governors of the University of Alberta, Edmonton (CA)

(72) Inventors: Herbert Yang, Edmonton (CA); Xida Chen, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 112 days.

(21) Appl. No.: 15/269,509

(22) Filed: Sep. 19, 2016

(65) Prior Publication Data

US 2017/0085864 A1   Mar. 23, 2017

Related U.S. Application Data

(60) Provisional application No. 62/221,737, filed on Sep. 22, 2015.

(51) Int. Cl.
  *G06T 7/521*   (2017.01)
  *G01B 11/00*   (2006.01)

(52) U.S. Cl.
  CPC ............ *G06T 7/521* (2017.01); *G01B 11/002* (2013.01); *G06T 2207/10016* (2013.01); *G06T 2207/10024* (2013.01); *G06T 2207/10152* (2013.01)

(58) Field of Classification Search
  CPC .................. G01B 11/002; G06T 7/521; G06T 2207/10016; G06T 2207/10024; G06T 2207/10152
  See application file for complete search history.

(56) References Cited

U.S. PATENT DOCUMENTS 9,753,140 B2 *   9/2017   Cottrell ................... G01S 17/89

\* cited by examiner

*Primary Examiner* — Huy T Nguyen
(74) *Attorney, Agent, or Firm* — ATMAC Patent Services Ltd.; Andrew T. MacMillan

(57) ABSTRACT

An underwater camera system includes a projector operable to project a pattern of electromagnetic radiation toward a target object. The electromagnetic radiation includes at least three different wavelengths. A sensor directed toward the target object receives reflected electromagnetic radiation from the target object and stores corresponding image data received from the sensor. One or more processors process the image data to compute a refractive normal according to a wavelength dispersion represented by differences in the image data, and to compute an interface distance corresponding to a distance from a center point of the sensor to a first refractive interface nearest the sensor according to the refractive normal. The processors generate a 3D representation of the target object by back projecting each pixel of the image data at the first, second, and third wavelengths in order to determine an object point location according to the refractive normal and interface distance.

20 Claims, 16 Drawing Sheets

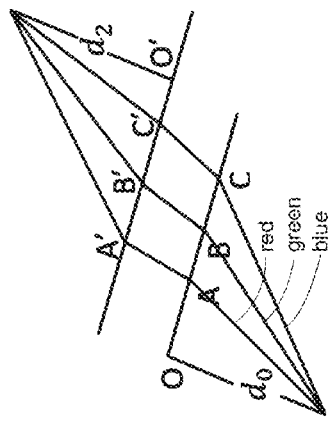
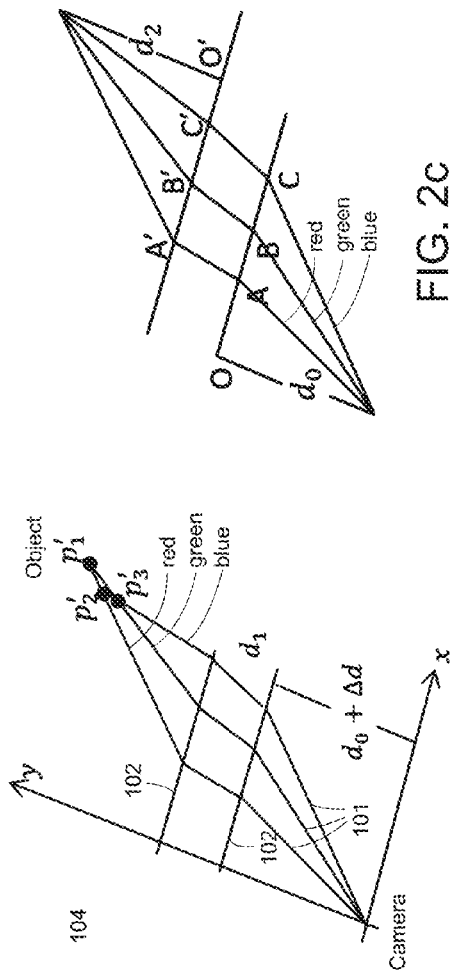
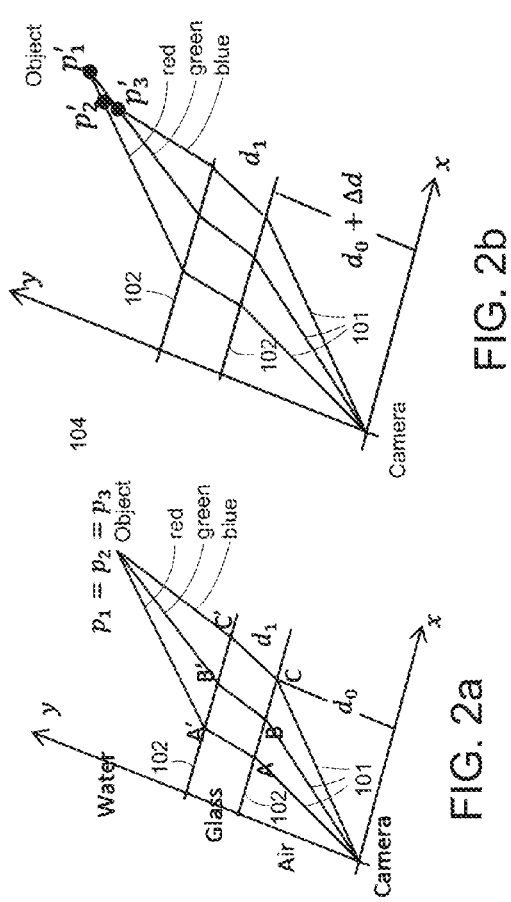
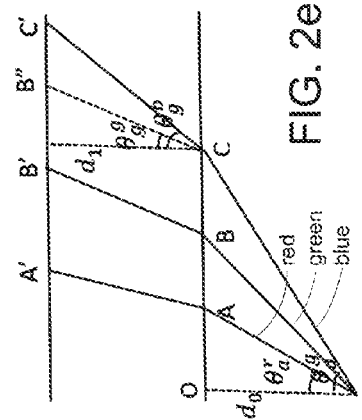
FIG. 2a  FIG. 2b  FIG. 2c  FIG. 2d  FIG. 2e Plots of $d_{12}$, $d_{13}$, $d_{23}$ When the observed pixel is corrupted by Gaussian noise with variance of 0.5 pixels When the observed pixel is Noise Free

UNDERWATER 3D IMAGE RECONSTRUCTION UTILIZING TRIPLE WAVELENGTH DISPERSION AND CAMERA SYSTEM THEREOF

CROSS-REFERENCE TO RELATED APPLICATIONS

This application claims the benefit of priority of U.S. Provisional Application No. 62/221,737 filed Sep. 22, 2015, which is incorporated herein by reference.

BACKGROUND OF THE INVENTION (1) Field of the Invention

The invention pertains generally to underwater cameras. More specifically, the invention relates to a closed-form solution to single underwater camera calibration using triple wavelength dispersion and its application to 3D reconstruction of a target object.

(2) Description of the Related Art

Computer vision has been a popular method to explore the underwater environment used by several groups of researchers such as biologists and geologists. It has many applications such as scientific exploration of the structure of the sea floor, and the monitoring of the undersea habitat. Hence, many researchers are interested in underwater computer vision. A fundamental and important topic in this area is underwater camera calibration which includes estimating the camera housing parameters. Camera calibration is a required step for recovering the 3D geometry of a scene using 2D images.

Examples of related work in this field include the following:

[1] A. Agrawal, S. Ramalingam, Y. Taguchi, and V. Chari. A theory of multi-layer flat refractive geometry. In CVPR, pages 3346-3353, 2012.

[2] A. N. Bashkatov and E. A. Genina. Water refractive index in dependence on temperature and wavelength: a simple approximation. In SPIE, pages 393-395, 2003.

[3] Y.-J. Chang and T. Chen. Multi-view 3d reconstruction for scenes under the refractive plane with known vertical direction. In ICCV, pages 351-358, 2011.

[4] V. Chari and P. Sturm. Multiple-view geometry of the refractive plane. In BMVC, London, UK, 2009.

[5] X. Chen and Y.-H. Yang. Two-view camera housing parameters calibration for multi-layer flat refractive interface. In CVPR, pages 524-531, 2014.

[6] R. Ferreira, J. Costeira, and J. A. Santos. Stereo reconstruction of a submerged scene. In IbPRIA, pages 102-109, 2005.

[7] A. Jordt-Sedlazeck and R. Koch. Calibration of housing parameters for underwater stereo-camera rigs. In BMVC, pages 118.1-118.11, 2011.

[8] A. Jordt-Sedlazeck and R. Koch. Refractive structure-from-motion on underwater images. In ICCV, pages 57-64, 2013.

[9] L. Kang, L. Wu, and Y.-H. Yang. Experimental study of the influence of refraction on underwater three-dimensional reconstruction using the svp camera model. Applied Optics, 51(31):7591-7603, 2012.

[10] L. Kang, L. Wu, and Y.-H. Yang. Two-view underwater structure and motion for cameras under flat refractive interfaces. In ECCV, pages 303-316, 2012.

[11] R. Kawahara, S. Nobuhara, and T. Matsuyama. A pixel-wise varifocal camera model for efficient forward projection and linear extrinsic calibration of underwater cameras with flat housings. In ICCV Workshop, pages 819-824, 2013.

[12] J.-M. Lavest, G. Rives, and J.-T. Lapreste. Underwater camera calibration. In ECCV, pages 654-668, 2000.

[13] O. Pizarro, R. Eustice, and H. Singh. Relative pose estimation for instrumented, calibrated imaging platforms. In Proc. of DICTA, pages 601-612, 2003.

[14] J. P. Queiroz-Neto, R. L. Carceroni, W. Barros, and M. F. M. Campos. Underwater stereo. In SIBGRAPI, pages 170-177, 2004.

[15] D. Scharstein and R. Szeliski. High-accuracy stereo depth maps using structured light. In CVPR, pages 195-202, 2003.

[16] T. Treibitz, Y. Y. Schechner, and H. Singh. Flat refractive geometry. In CVPR, 2008.

[17] T. Yau, M. Gong, and Y.-H. Yang. Underwater camera calibration using wavelength triangulation. In CVPR, 2013.

[18] Z. Zhang. A flexible new technique for camera calibration. IEEE Transactions on PAMI, 22(11):1330-1334, 2000.

Each of the above referenced documents are incorporated herein by reference.

Despite the remarkable success [18] for land-based camera systems, underwater camera calibration has not been addressed until recently. In a typical underwater camera system, the camera is placed inside a watertight housing, and views the scene through a flat piece of glass. As a result, the light that travels into the camera undergoes two refractions and its path is not a straight line, the result of which causes distortion in the captured images. The distortion depends on the scene depth and cannot be simply modeled as lens radial distortion [13]. Therefore, calibrating underwater cameras remains a challenging problem in the computer vision area.

In underwater computer vision, the refraction effect is sometimes ignored [14], or approximated by [6, 9, 12]. However, since the refraction effects are highly non-linear and depend on scene geometry, these methods usually produce errors. Treibitz et al. [16] show that the bundle of rays imaged by a perspective camera through a refractive interface does not correspond to a single-viewpoint (SVP) camera. They develop a technique to recover the distance from the camera center to the interface under the assumption that there is only one refraction. The method requires a planar checkerboard pattern with known distance from the camera. Another requirement which is not practical is to require the refractive interface parallel to the image plane.

Other problems and limitations are also apparent from the existing work. Chari and Sturm [4] derive a 12×12 refractive fundamental matrix analogous to the ordinary fundamental matrix. However, there is no demonstrated practical application disclosed in their paper. A 3D reconstruction method is proposed in [3] which models the refraction effect as a function of scene depth. One limitation is that it requires an Inertial Measurement Unit (IMU) to provide the vertical direction of each view. Another limitation is that all the cameras must share the same interface. A calibration method is presented in [7] which does not require a calibration target. It can account for two refractions by assuming that the glass thickness is known. One limitation is that its nonlinear optimization takes hours and the results of real data are not compared to the ground truth. Kang et al. [10] develop an optimization procedure with the limitation that the refractive interface is parallel to the image plane. Agrawal et al. [1] propose an efficient calibration method by showing that the flat refractive geometry corresponds to an axial camera. With this finding, all the refraction parameters can be computed by solving a set of linear equations. Non-linear optimization is still required to refine the results. Nevertheless, the method assumes the 3D geometry of the calibration target to be known. Therefore, a checkerboard pattern is typically used which may not be practical when the cameras are deployed deep undersea. More recently, Yau et al. [17] extend the work of [1] by accounting for the dispersion of light which improves the calibration accuracy. One limitation is that it requires a heavy custom-built submersible light box which weighs over 60 lbs. The method proposed in [8] uses a "virtual camera" error function where each 3D point is projected using an imaginary perspective camera (the "virtual camera"), and an iterative nonlinear optimization is applied to minimize the reprojection error. It is claimed that high accuracy is achieved in calibrating the refraction parameters. However, the results of real experiments are not evaluated against the ground truth. A virtual camera model is presented in [11] to model refraction as a pinhole camera with a specific focal length for each image pixel. The model can be used for estimating the camera pose when the housing parameters are provided. A new method is presented in [5] to calibrate the housing parameters with a limitation that the camera pose is provided.

BRIEF SUMMARY OF THE INVENTION

In view of the limitations of the existing methods described above, an object of certain embodiments of the invention is to require no assumption on the configuration of the camera system or the refractive interface, and no calibration target. A beneficial method disclosed according to certain embodiments estimates the housing parameters and performs 3D object reconstruction using one single camera with high accuracy.

Disclosed according to an exemplary embodiment of the invention is a method of estimating the housing parameters of an underwater camera by making full use of triple wavelength dispersion. The method is based on a finding that there is a closed-form solution to the distance from the camera center to the refractive interface once the refractive normal is known. The correctness of this finding can be mathematically proved. The refractive normal can be estimated by solving a set of linear equations using wavelength dispersion. In an advantageous embodiment, the method does not require any calibration target such as a checkerboard pattern which may be difficult to manipulate when the camera is deployed deep undersea. Real experiments and computerized simulations have been carried out to verify the correctness and robustness to noise of the method. Results of real experiments are included and show that the method works as expected. Accuracy of results were evaluated against the ground truth in both simulated and real experiments. According to an exemplary embodiment, the dispersion is applied to compute the 3D shape of an object using a single camera.

In most previous work, the dispersion of light, which is a common phenomenon that light refracts at a different angle depending on its wavelength, was ignored. In contrast, Yau et al. [17] study the characteristic of double wavelength dispersion, and exploit dispersion to compute the camera housing parameters. Motivated by their method, the inventors of the present application have made an exciting discovery that with triple wavelength dispersion, the interface distance has a closed-form solution once the refractive normal is known. An advantage of some embodiments is that no calibration object such as a checkerboard pattern or a light box is required. Further, it is possible to find a unique solution of the camera housing parameters and provide a unique 3D object reconstruction using a single camera. This is unlike previous work either requiring a calibration object, or imposing constraints unneeded in certain embodiments of the present invention. For example, the refractive interface is typically required to be parallel to the image plane [10]. As well, instead of a closed-form solution, previous methods often initialize the housing parameters with either non-linear optimization [8] or a manual guess [7].

Examples of advantageous contributions of certain embodiments of the invention include a new mathematical proof and derivation of a closed-form solution of the interface distance using triple wavelength dispersion after the refractive normal is determined, a new method to calibrate the camera housing parameters without using any calibration objects, and a new method to perform 3D reconstruction using a single camera by exploiting triple wavelength dispersion.

According to an exemplary embodiment of the invention there is disclosed a system including a projector selectively operable to project a pattern of electromagnetic radiation toward a target object. The electromagnetic radiation includes at least three different wavelengths including a first wavelength, a second wavelength, and a third wavelength. The system further includes a sensor directed toward the target object to receive reflected electromagnetic radiation from the target object, a storage device, and a processor coupled to the projector, sensor, and storage device. By the processor executing software loaded from the storage device, the processor is operable to send control signals to the projector causing the projector to project the pattern of electromagnetic radiation toward the target object at each of the first, second and third wavelengths. The processor is further operable to store into the storage device image data received from the sensor, the image data corresponding to the reflected electromagnetic radiation detected by the sensor at each of the first, second, and third wavelengths. The processor is further operable to process the image data to compute a refractive normal according to a wavelength dispersion represented by differences in the image data at each of the first, second, and third wavelengths. The processor is further operable to process the image data to compute an interface distance corresponding to a distance from a center point of the sensor to a first refractive interface nearest the sensor according to the refractive normal. The processor is further operable to generate a 3D representation of the target object by back projecting each pixel of the image data at the first, second, and third wavelengths in order to determine an object point location according to the refractive normal and interface distance. The processor is further operable to store the 3D representation of the target object in the storage device.

According to an exemplary embodiment of the invention there is disclosed a method including projecting a pattern of electromagnetic radiation toward a target object, the electromagnetic radiation comprising at least three different wavelengths including a first wavelength, a second wavelength, and a third wavelength. The method further includes receiving reflected electromagnetic radiation from the target object and storing image data, the image data corresponding to the reflected electromagnetic radiation detected at each of the first, second, and third wavelengths. The method further includes processing the image data to compute a refractive normal according to a wavelength dispersion represented by differences in the image data at each of the first, second, and third wavelengths. The method further includes processing the image data to compute an interface distance corresponding to a distance from a center point of the sensor to a first refractive interface nearest the sensor according to the refractive normal. The method further includes generating a 3D representation of the target object by back projecting each pixel of the image data at the first, second, and third wavelengths in order to determine an object point location according to the refractive normal and interface distance. The method further includes storing the 3D representation of the target object in a storage device.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 2a, FIG. 2b, FIG. 2c, FIG. 2d, FIG. 2e show a number of cases of triple wavelength dispersion.

DETAILED DESCRIPTION

Figure 1:
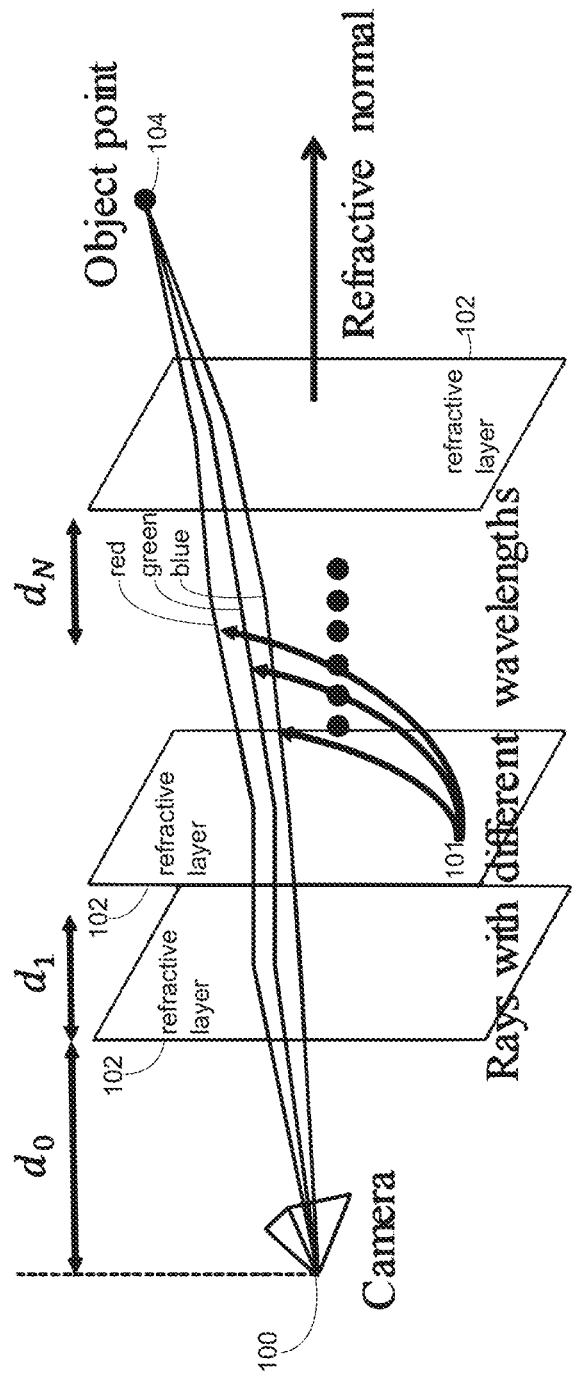
FIG. 1 shows the refraction model utilized according to an exemplary embodiment of the present invention.

FIG. 1 shows the refraction model utilized according to an exemplary embodiment of the present invention. A pinhole perspective camera is viewing the object through multiple flat refractive layers where all layers are parallel to each other, which means that all layers have the same refractive interface normal n. The number of layers is N and each layer has a thickness of $d_i$. The distance from the camera center to the first refractive interface is denoted as the "interface distance", $d_0$. Assume that the object is able to emit three different wavelengths of light (red, green and blue), then the dispersion can be observed due to different refractive indices for different wavelengths. One goal in this embodiment is to compute both the refractive normal n and the interface distance $d_0$.

This embodiment is directed at a specific refraction case which is a common and practical one. In particular, it is assumed that there are two refractions which are air→glass→water. This is a common scenario for a camera system deployed underwater and for the lab environment. The method in this example assumes that the thickness of the glass is known because it can be easily measured.

Interface Normal Computation

The method of normal estimation is the same as the one described in [17]. In particular, when observed by the camera, an object point reaches different pixel locations in the camera through different rays due to different wavelengths. Denote $v_a, v_b$ as the two rays with different wavelengths that travel in air and reach the camera, then these two rays must lie on the same plane as the refractive normal n. As a result, a constraint for n can be written as follows.

$$(v_a \times v_b)^T n = 0. \tag{1}$$

Due to different wavelengths, $v_a \neq v_b$ and the above constraint describes that n is on the same plane formed by $v_a$ and $v_b$. Assume that there are multiple object points described above, then by stacking multiple linear equations yields a linear system. Thus, the refractive normal n can be computed by solving this linear system.

Interface Distance Computation

One aspect of the method in this embodiment involves estimating the interface distance $d_0$. A mathematical proof and derivation provided below shows that there is a closed-form solution to $d_0$ when the interface normal n is known based on the assumption that triple wavelength dispersion is observed. Because of this finding, the method of this embodiment does not require any calibration target.

FIG. 2(a) depicts a typical case of triple wavelength dispersion. Due to the dispersion of the red, green and blue light, an object point is observed at three different pixel locations in the captured images. The direction of the three rays in air can be computed once the camera intrinsic parameters are known. Since the refractive interface normal n has already been obtained (see "Interface Normal Computation" above), the direction of the rays traveling in glass and in water can be computed as well. When $d_0$ is the ground truth, the three rays in water intersect at three coincident points $p_1$, $p_2$ and $p_3$. With reference to FIG. 2(b), in the following, a theorem is presented to prove that when $d_0$ is changed to $d_0 + \Delta d$ with any $\Delta d \neq 0$, the three rays in water will intersect at three non-coincident points $p'_1$, $p'_2$ and $p'_3$, and vice versa. Using this finding, $d_0$ corresponds to the point at which the three points $p_1, p_2$ and $p_3$ are coincident. It is noteworthy that triple wavelength dispersion is beneficially utilized and cannot be replaced using two wavelengths such as the method in [17]. The reason is as follows. Assume that there are only two wavelengths (red and blue), and hence there are two rays in water. It can be seen that with any $d_0$, these two rays in water will always intersect at one point. Because no calibration target is utilized, it cannot be determined which $d_0$ corresponds to the ground truth point in water. In contrast, the method of this embodiment can determine the correct $d_0$ which corresponds to the point where $p_1$, $p_2$ and $p_3$ are coincident. In general, the method can be extended to more than 3 wavelengths in other embodiments.

Denote the directions of the three rays in air as $v_a^r$, $v_a^g$, $v_a^b$, where the subscript "a" represents air and the superscript color, namely, red(r), green(g) and blue(b). Using this notation, the directions of rays are denoted as $v_g^r$, $v_g^g$, $v_g^b$ glass, and $v_w^r$, $v_w^g$, $v_w^b$ in water.

Lemma 1 $v_a^r$, $v_a^g$, $v_a^b$, $v_g^r$, $v_g^g$, $v_g^b$, $v_w^r$, $v_w^g$, $v_w^b$ are always on the same plane even if $\Delta d \neq 0$ as shown in FIG. 2(b).

Proof. According to Snell's Law, all the incoming rays and the refracted rays are on the same plane as the refractive normal. Moreover, in above section entitled "Interface Normal Computation", it was shown that $v_a^r$, $v_a^g$, $v_a^b$ are always on the same plane because they are due to the dispersion effects. In other words, all the 9 rays in FIG. 2(a) are on the same plane. Notice that once the interface normal n is known, $v_g^r$, $v_g^g$, $v_g^b$ and $v_w^r$, $v_w^g$, $v_w^b$ and are fixed because they depend on $v_a^r$, $v_a^g$, $v_a^b$ and n only. Therefore, even if $d_0$ is changed to $d_0+\Delta d$, the ray directions do not change. Hence, the 9 rays are always on the same plane.

Since all the rays are on the same plane, the problem can be simplified from 3D to 2D. In particular, assume that the z plane is aligned with the plane that is formed by the above 9 rays. As shown in FIG. 2(a), the camera center is selected as the origin of the new coordinate system. The y axis is perpendicular to the refractive interface, and the x axis is set so that all the 9 rays are in the first quadrant. The slopes of the 9 rays are denoted as $m_a^r$, $m_a^g$, $m_a^b$, $m_g^r$, $m_g^g$, $m_g^b$, $m_w^r$, $m_w^g$, $m_w^b$.

Theorem 1 $p'_1 \neq p'_2$, $p'_1 \neq p'_3$ and $p'_2 \neq p'_3 \Leftrightarrow \Delta d \neq 0$.

Proof We firstly prove $\Delta d \neq 0 \Rightarrow p'_1 \neq p'_2$, and more details are provided in the supplemental materials provided below.

The three rays in air pass through the origin. Therefore their equations are $y=m_a^r x$, $y=m_a^g x$ and $y=m_a^b x$. These three rays intersect the inner glass interface at three different points whose coordinates are $$\left(\frac{d_0}{m_a^r}, d_0\right), \left(\frac{d_0}{m_a^g}, d_0\right) \text{ and } \left(\frac{d_0}{m_a^b}, d_0\right).$$

Similarly, the equations for the rays in glass and in water, as well as their intersections with the outer glass interface, can be computed. Further details are provided below in the supplemental materials; the coordinates of $p_1$, $p_2$ and $p_3$ are provided here. Consider only the x components of these three points, which are written as:

$$p_1(x) = \frac{\frac{d_1 m_w^r}{m_g^r} - \frac{d_1 m_w^g}{m_g^g} + \frac{d_0 m_w^r}{m_a^r} - \frac{d_0 m_w^g}{m_a^g}}{m_w^r - m_w^g} \quad (2)$$

$$p_2(x) = \frac{\frac{d_1 m_w^r}{m_g^r} - \frac{d_1 m_w^b}{m_g^b} + \frac{d_0 m_w^r}{m_a^r} - \frac{d_0 m_w^b}{m_a^b}}{m_w^r - m_w^b}$$

$$p_3(x) = \frac{\frac{d_1 m_w^g}{m_g^g} - \frac{d_1 m_w^b}{m_g^b} + \frac{d_0 m_w^g}{m_a^g} - \frac{d_0 m_w^b}{m_a^b}}{m_w^g - m_w^b}$$

Since $p_1=p_2=p_3$, $p_1(x)=p_2(x)=p_3(x)$.

The slopes of all the rays in FIG. 2(b) are the same as those shown in FIG. 2(a). Based on the above results, when $d_0$ is changed to $d_0+\Delta d$, $p'_1(x)$, $p'_2(x)$, $p'_3(x)$ can be written as follows:

$$p'_1(x) = p_1(x) + \frac{\frac{\Delta d m_w^r}{m_a^r} - \frac{\Delta d m_w^g}{m_a^g}}{m_w^r - m_w^g} \quad (3)$$

$$p'_2(x) = p_2(x) + \frac{\frac{\Delta d m_w^r}{m_a^r} - \frac{\Delta d m_w^b}{m_a^b}}{m_w^r - m_w^b}$$

$$p'_3(x) = p_3(x) + \frac{\frac{\Delta d m_w^g}{m_a^g} - \frac{\Delta d m_w^b}{m_a^b}}{m_w^g - m_w^b}.$$

Combining Eq. 2 and 3, it can be seen that in order to prove $p'_1(x) \neq p'_2(x)$, it is needed to prove that $$\left(\frac{m_w^r}{m_a^r} - \frac{m_w^g}{m_a^g}\right)(m_w^r - m_w^b) \neq \left(\frac{m_w^r}{m_a^r} - \frac{m_w^b}{m_a^b}\right)(m_w^r - m_w^g). \quad (4)$$

With careful derivation (please refer to the supplemental materials, provided below), Eq. 4 can be simplified to $$\frac{|A'C'|}{|AC|} \neq \frac{|B'C'|}{|BC|}$$

where $|AC|$ denotes the length of line segment AC. Denote the angle between the y axis and the red ray in air as $\theta_a^r$, and we use a similar notation such as $\theta_a^g$, $\theta_a^b$, $\theta_g^r$, $\theta_g^g$, $\theta_g^b$. With this notation, $$\frac{|A'C'|}{|AC|} \neq \frac{|B'C'|}{|BC|}$$

is equivalent to Eq. 5

$$\frac{\frac{\sin\theta_g^r}{\sqrt{1-(\sin\theta_g^r)^2}} - \frac{\sin\theta_g^b}{\sqrt{1-(\sin\theta_g^b)^2}}}{\frac{\mu_g^r \sin\theta_g^r}{\sqrt{1-(\mu_g^r \sin\theta_g^r)^2}} - \frac{\mu_g^b \sin\theta_g^b}{\sqrt{1-(\mu_g^b \sin\theta_g^b)^2}}} \neq \quad (5)$$

$$\frac{\frac{\sin\theta_g^r}{\sqrt{1-(\sin\theta_g^r)^2}} - \frac{\sin\theta_g^g}{\sqrt{1-(\sin\theta_g^g)^2}}}{\frac{\mu_g^r \sin\theta_g^r}{\sqrt{1-(\mu_g^r \sin\theta_g^r)^2}} - \frac{\mu_g^g \sin\theta_g^g}{\sqrt{1-(\mu_g^g \sin\theta_g^g)^2}}}$$

In Eq. 5, $\mu_g^r$ denotes the refractive index for the red light in glass. It can be seen that the left-hand-side of Eq. 5 is a function of $\mu_g^r$ and and $\mu_g^b$. This function is denoted as $f(\mu_g^r, \mu_g^b)$. The right-hand-side can be denoted as $g(\mu_g^r, \mu_g^g)$. Eq. 5 is proved by contradiction. Assume that $f(\mu_g^r, \mu_g^b) = g(\mu_g^r, \mu_g^g)$, it can be seen that this is possible only when both sides are equal to the same constant. If $f(\mu_g^r, \mu_g^b)$ is a constant, it implies that $\mu_g^r$ and $\mu_g^b$ are related, i.e. they are not independent which is a contradiction.

Hence, $p'_1 \neq p'_2$ for any $\Delta d \neq 0$.

Denote the distance between $p'_1$ and $p'_2$ as $d'_{12}$. In the following, it is proved that it varies linearly with $\Delta d$.

Theorem 2 The distance $d'_{ij}$ where $i \neq j, i=\{1,2\}, j=\{2,3\}$, varies linearly with $\Delta d$.

Proof. The proof is given for the case $i=1, j=2$. Other cases are similar. Focus is only on the x component of $d'_{12}$ because the y component is a linear function of x. From Eq. 3, it is derived that $$p'_1(x) - p'_2(x) = p_1(x) - p_2(x) + \Delta d \left( \frac{\frac{m_w^r}{m_a^r} - \frac{m_w^g}{m_a^g}}{m_w^r - m_w^g} - \frac{\frac{m_w^r}{m_a^r} - \frac{m_w^b}{m_a^b}}{m_w^r - m_w^b} \right) \quad (6)$$

Because $p_1(x)=p_2(x)$ and from Theorem 1 we have $$\frac{\frac{m_w^r}{m_a^r} - \frac{m_w^g}{m_a^g}}{m_w^r - m_w^g} \neq \frac{\frac{m_w^r}{m_a^r} - \frac{m_w^b}{m_a^b}}{m_w^r - m_w^b},$$

we conclude that $p'_1(x)-p'_2(x) \neq 0$ and varies linearly with $\Delta d$.

Theorem 3 There is a closed-form solution to $d_0$.

Proof. From Eq. 2 together with $p_1(x)=p_2(x)$, we can derive Eq. 7, which concludes that $d_0$ has a closed-form solution:

$$d_0 = \frac{\left(\frac{d_1 m_w^r}{m_g^r} - \frac{d_1 m_w^g}{m_g^g}\right)(m_w^r - m_w^b) - \left(\frac{d_1 m_w^r}{m_g^r} - \frac{d_1 m_w^b}{m_g^b}\right)(m_w^r - m_w^g)}{\left(\frac{m_w^r}{m_a^r} - \frac{m_w^b}{m_a^b}\right)(m_w^r - m_w^g) - \left(\frac{m_w^r}{m_a^r} - \frac{m_w^g}{m_a^g}\right)(m_w^r - m_w^b)}. \quad (7)$$

It can be seen that $d_0$ is easy to compute once the interface normal n is estimated. In here, all the rays from three wavelengths are needed to compute $d_0$. In the supplemental materials below, it is shown that $d_0$ depends on the difference of the refractive indices among different wavelengths, which is shown in previous studies that this difference is nearly constant at any temperature [2].

3D Reconstruction

Because an object point is observed at three different pixel locations due to dispersion, one can backward project from these three pixel locations to compute the 3D coordinate of this object point once the interface normal n and distance $d_0$ are known. Due to noise, the barycenter of $p_1$, $p_2$ and $p_3$ is computed as the final 3D point. One possibility is to compute the intersection of the red and blue rays in water as the final 3D point, which utilizes two wavelengths only. However, it has been found that using three wavelengths generates better results in general. Please refer to the following supplemental materials for more details.

Interface Distance Computation—Supplemental Details

Let's denote the directions of the three rays in air as $v_a^r$, $v_a^g$, $v_a^b$, where the subscript "a" represents air and the superscript color, namely, red(r), green(g) and blue(b). Using this notation, the directions of rays are denoted as $v_g^r$, $v_g^g$, $v_g^b$ in glass, and $v_w^r$, $v_w^g$, $v_w^b$ in water.

Lemma 1 $v_a^r$, $v_a^g$, $v_a^b$, $v_g^r$, $v_g^g$, $v_g^b$, $v_w^r$, $v_w^g$, $v_w^b$ are always on the same plane even if $\Delta d \neq 0$ as shown in FIG. 2(b).

Proof According to Snell's Law, all the incoming rays and the refracted rays are always on the same plane as the refractive normal. Moreover, as demonstrated above, $v_a^r v_a^g$, $v_a^b$ are always on the same plane because they are due to the dispersion effects. In other words, all the 9 rays in FIG. 2a are on the same plane. Notice that once the interface normal n is known, $v_g^r$, $v_g^g$, $v_g^b$ and $v_w^r$, $v_w^g$, $v_w^b$ are also fixed because they depend on $v_a^r$, $v_a^g$, $v_a^b$ and n only. Therefore, even if $d_0$ is changed to $d_0+\Delta d$, the ray direction does not change. As a result, the 9 rays are always on the same plane.

Now that all the rays are on the same plane, the problem can be simplified from 3D to 2D. In particular, assume that the z plane is aligned with the plane that is formed by the above 9 rays. As shown in FIG. 2a, the camera center is selected as the origin of the new coordinate system. The y axis is perpendicular to the refractive interface, and the x axis is set so that all the 9 rays are at the first quadrant. Denote the slope of the 9 rays as $m_a^r$, $m_a^g$, $m_a^b$, $m_g^r$, $m_g^g$, $m_g^b$, $m_w^r$, $m_w^g$, $m_w^b$.

Theorem 2 In FIG. 2(b), $p'_1 \neq p'_2$, $p'_1 \neq p'_3$ and $p'_2 \neq p'_3 \Leftrightarrow \Delta d \neq 0$.

Proof. The direction of $\Leftarrow$ is proved first. The three rays in air pass the origin, therefore their equations are written as follows.

$$y=m_a^r x$$

$$y=m_a^g x$$

$$y=m_a^b x \quad (5.10)$$

These three rays intersect the inner glass interface at three different points whose coordinates are $$\left(\frac{d_0}{m_a^r}, d_0\right), \left(\frac{d_0}{m_a^g}, d_0\right) \text{ and } \left(\frac{d_0}{m_a^b}, d_0\right).$$

Similar to that, The equation of those three rays inside the glass can be written as follows.

$$y = m_g^r x + \left(d_0 - d_0 \frac{m_g^r}{m_a^r}\right) \quad (5.11)$$

$$y = m_g^g x + \left(d_0 - d_0 \frac{m_g^g}{m_a^g}\right)$$

$$y = m_g^b x + \left(d_0 - d_0 \frac{m_g^b}{m_a^b}\right)$$

These three rays intersect the outer glass at three points where the coordinate are $$\left(\frac{d_1}{m_g^r} + \frac{d_0}{m_a^r}, d_0 + d_1\right), \left(\frac{d_1}{m_g^g} + \frac{d_0}{m_a^g}, d_0 + d_1\right) \text{ and}$$

$$\left(\frac{d_1}{m_g^b} + \frac{d_0}{m_a^b}, d_0 + d_1\right).$$

Given these three points, the equation for the three rays in water can be written as follows.

$$y = m_w^r x + \left(d_0 + d_1 - d_1 \frac{m_w^r}{m_g^r} - d_0 \frac{m_w^r}{m_a^r}\right) \quad (5.12)$$

$$y = m_w^g x + \left(d_0 + d_1 - d_1 \frac{m_w^g}{m_g^g} - d_0 \frac{m_w^g}{m_a^g}\right)$$

$$y = m_w^b x + \left(d_0 + d_1 - d_1 \frac{m_w^b}{m_g^b} - d_0 \frac{m_w^b}{m_a^b}\right)$$

Assume that $p_1$ is the intersection between the red and green ray, $p_2$ the red and blue ray and $p_3$ the green and blue ray. The coordinate for $p_1$, $p_2$ and $p^3$ can now be computed. In particular, let's focus on the X component of these three points only and they are written as follows.

$$p_1(x) = \frac{\frac{d_1 m_w^r}{m_g^r} - \frac{d_1 m_w^g}{m_g^g} + \frac{d_0 m_w^r}{m_a^r} - \frac{d_0 m_w^g}{m_a^g}}{m_w^r - m_w^g} \quad (5.13)$$

$$p_2(x) = \frac{\frac{d_1 m_w^r}{m_g^r} - \frac{d_1 m_w^b}{m_g^b} + \frac{d_0 m_w^r}{m_a^r} - \frac{d_0 m_w^b}{m_a^b}}{m_w^r - m_w^b}$$

$$p_3(x) = \frac{\frac{d_1 m_w^g}{m_g^g} - \frac{d_1 m_w^b}{m_g^b} + \frac{d_0 m_w^g}{m_a^g} - \frac{d_0 m_w^b}{m_a^b}}{m_w^g - m_w^b}$$

From $p^1 = p^2 = p^3$ one can infer that $p_1(x) = p_2(x) = p_3(x)$.

The slope of all rays in FIG. 2b is the same as that of in FIG. 2a. Following the above calculation, the three rays in air have the same equation as shown in Eq. 5.10. They intersect the inner glass interface at three points with coordinate $$\left(\frac{d_0 + \Delta d}{m_a^r}, d_0 + \Delta d\right), \left(\frac{d_0 + \Delta d}{m_a^g}, d_0 + \Delta d\right) \text{ and }$$

$$\left(\frac{d_0 + \Delta d}{m_a^b}, d_0 + \Delta d\right).$$

With that, the equation of the three rays inside the glass can be written as follows.

$$y = m_g^r x + \left(d_0 + \Delta d - (d_0 + \Delta d)\frac{m_g^r}{m_a^r}\right) \quad (5.14)$$

$$y = m_g^g x + \left(d_0 + \Delta d - (d_0 + \Delta d)\frac{m_g^g}{m_a^g}\right)$$

$$y = m_g^b x + \left(d_0 + \Delta d - (d_0 + \Delta d)\frac{m_g^b}{m_a^b}\right)$$

These three rays intersect the outer glass at three points where the coordinate are $$\left(\frac{d_1}{m_g^r} + \frac{d_0 + \Delta d}{m_a^r}, d_0 + \Delta d + d_1\right), \left(\frac{d_1}{m_g^g} + \frac{d_0 + \Delta d}{m_a^g}, d_0 + \Delta d + d_1\right) \text{ and}$$

$$\left(\frac{d_1}{m_g^b} + \frac{d_0 + \Delta d}{m_a^b}, d_0 + \Delta d + d_1\right).$$

Given these three points, the equation for the three rays in water can be written as follows.

$$y = m_w^r x + \left(d_0 + \Delta d + d_1 - d_1 \frac{m_w^r}{m_g^r} - (d_0 + \Delta d)\frac{m_w^r}{m_a^r}\right) \quad (5.15)$$

$$y = m_w^g x + \left(d_0 + \Delta d + d_1 - d_1 \frac{m_w^g}{m_g^g} - (d_0 + \Delta d)\frac{m_w^g}{m_a^g}\right)$$

$$y = m_w^b x + \left(d_0 + \Delta d + d_1 - d_1 \frac{m_w^b}{m_g^b} - (d_0 + \Delta d)\frac{m_w^b}{m_a^b}\right)$$

With the above equation, $p'_1(x)$, $p'_2(x)$, $p'_3(x)$ can be written as follows.

$$p'_1(x) = p_1(x) + \frac{\frac{\Delta d m_w^r}{m_a^r} - \frac{\Delta d m_w^g}{m_a^g}}{m_w^r - m_w^g} \quad (5.16)$$

$$p'_2(x) = p_2(x) + \frac{\frac{\Delta d m_w^r}{m_a^r} - \frac{\Delta d m_w^b}{m_a^b}}{m_w^r - m_w^b}$$

$$p'_3(x) = p_3(x) + \frac{\frac{\Delta d m_w^g}{m_a^g} - \frac{\Delta d m_w^b}{m_a^b}}{m_w^g - m_w^b}$$

Because $p_1(x) = p_2(x)$, one can see that in order to prove $p'_1(x) \neq p'_2(x)$, it only needs to prove that $$\left(\frac{m_w^r}{m_a^r} - \frac{m_w^g}{m_a^g}\right)(m_w^r - m_w^b) \neq \left(\frac{m_w^r}{m_a^r} - \frac{m_w^b}{m_a^b}\right)(m_w^r - m_w^g). \quad (5.17)$$

FIG. 2c provides a light ray diagram for derivation of Eq. 18.

Denote the length of line segment OA in Figure FIG. 2c as $l_a^r$. Similar to that, the length of OB, OC is denoted as $l_a^g, l_a^b$. Since $m_a^r$ denotes the slope of a ray, it can be written as $$m_a^r = \frac{d_0}{l_a^r}, m_a^g = \frac{d_0}{l_a^g} \text{ and } m_a^b = \frac{d_0}{l_a^b}.$$

Denote the length of O'A', O'B', O'C' as $l_w^r, l_w^g, l_w^b$, and then $$m_w^r = \frac{d_2}{l_w^r}, m_w^g = \frac{d_2}{l_w^g}, m_w^b = \frac{d_2}{l_w^b}.$$

Substitute these into Eq. 5.17, the following equation can be derived.

$$\left(\frac{d_2 l_a^r}{d_0 l_w^r} - \frac{d_2 l_a^g}{d_0 l_w^g}\right)\left(\frac{d_2}{l_w^r} - \frac{d_2}{l_w^b}\right) \neq \left(\frac{d_2 l_a^r}{d_0 l_w^r} - \frac{d_2 l_a^b}{d_0 l_w^b}\right)\left(\frac{d_2}{l_w^r} - \frac{d_2}{l_w^g}\right) \Rightarrow$$

$$\left(\frac{l_a^r}{l_w^r} - \frac{l_a^g}{l_w^g}\right)\left(\frac{1}{l_w^r} - \frac{1}{l_w^b}\right) \neq \left(\frac{l_a^r}{l_w^r} - \frac{l_a^b}{l_w^b}\right)\left(\frac{1}{l_w^r} - \frac{1}{l_w^g}\right) \Rightarrow$$

$$\left(\frac{l_a^r l_w^g - l_a^g l_w^r}{l_w^r l_w^g}\right)\left(\frac{l_w^b - l_w^r}{l_w^r l_w^b}\right) \neq \left(\frac{l_a^r l_w^b - l_a^b l_w^r}{l_w^r l_w^b}\right)\left(\frac{l_w^g - l_w^r}{l_w^r l_w^g}\right) \Rightarrow$$

$$(l_a^r l_w^g - l_a^g l_w^r)(l_w^b - l_w^r) \neq (l_a^r l_w^b - l_a^b l_w^r)(l_w^g - l_w^r) \Rightarrow$$

$$l_w^r(l_a^g - l_a^b) + l_w^b(l_a^r - l_a^g) + l_w^g(l_a^b - l_a^r) \neq 0 \Rightarrow$$

-continued $$l_w^r(l_a^g - l_a^b + l_a^r - l_a^r) + l_w^b(l_a^r - l_a^g) + l_w^g(l_a^b - l_a^r) \neq 0 \Rightarrow$$

$$l_w^r(l_a^g - l_a^r) + l_w^r(l_a^r - l_a^b) + l_w^g(l_a^b - l_a^r) + l_w^b(l_a^r - l_a^g) \neq 0 \Rightarrow$$ (5)

$$(l_a^r - l_a^g)(l_w^b - l_w^r) \neq (l_a^r - l_a^b)(l_w^g - l_w^r)$$

Together with FIG. 2c, the above equation can be written as Eq. 5.18 where |AC| denotes length of the line segment AC.

$$\frac{|A'C'|}{|AC|} \neq \frac{|B'C'|}{|BC|}$$ (5.18)

FIGS. 2d and 2e show extension for Eq. 5.18.

Denote the angle between the y axis and the red ray in air as $\theta_a^r$, then similar notation such as $\theta_a^g$, $\theta_a^b$, $\theta_g^r$, $\theta_g^g$, $\theta_g^b$ can be used. With this notation, Eq. 5.18 can be further expanded. In FIG. 2d, line CA" is parallel to line AA', and the following derivation can be achieved.

$$\frac{|A'C'|}{|AC|} = \frac{|A'A''| + |A''C'|}{|AC|} = 1 + \frac{|A''C'|}{|AC|} = 1 + \frac{d_1(\tan\theta_g^b - \tan\theta_g^r)}{d_0(\tan\theta_a^b - \tan\theta_a^r)}$$ (5.19)

Moreover, the line CB" in FIG. 2e is parallel to BB', and hence the following equation can be derived.

$$\frac{|B'C'|}{|BC|} = \frac{|B'B''| + |B''C'|}{|BC|} = 1 + \frac{|B''C'|}{|BC|} = 1 + \frac{d_1(\tan\theta_g^g - \tan\theta_g^r)}{d_0(\tan\theta_a^g - \tan\theta_a^r)}$$ (5.20)

By combining Eq. 5.19, Eq. 5.20 and together with Eq. 5.18, the following equation is derived.

$$\frac{|A'C'|}{|AC|} \neq \frac{|B'C'|}{|BC|} \Rightarrow \frac{\tan\theta_g^r - \tan\theta_g^b}{\tan\theta_a^r - \tan\theta_a^b} \neq \frac{\tan\theta_g^r - \tan\theta_g^g}{\tan\theta_a^r - \tan\theta_a^g} \Rightarrow$$ (5.21)

$$\frac{\dfrac{\sin\theta_g^r}{\sqrt{1-(\sin\theta_g^r)^2}} - \dfrac{\sin\theta_g^b}{\sqrt{1-(\sin\theta_g^b)^2}}}{\dfrac{\mu_g^r \sin\theta_g^r}{\sqrt{1-(\mu_g^r \sin\theta_g^r)^2}} - \dfrac{\mu_g^b \sin\theta_g^b}{\sqrt{1-(\mu_g^b \sin\theta_g^b)^2}}} \neq$$

$$\dfrac{\dfrac{\sin\theta_g^r}{\sqrt{1-(\sin\theta_g^r)^2}} - \dfrac{\sin\theta_g^g}{\sqrt{1-(\sin\theta_g^g)^2}}}{\dfrac{\mu_g^r \sin\theta_g^r}{\sqrt{1-(\mu_g^r \sin\theta_g^r)^2}} - \dfrac{\mu_g^g \sin\theta_g^g}{\sqrt{1-(\mu_g^g \sin\theta_g^g)^2}}}$$

One can see that the left-hand-side of Eq. 5.21 is a function of $\mu_g^r$ and $\mu_g^b$. Let's denote it as $f(\mu_g^r, \mu_g^b)$. The right-hand-side can be denoted as $g(\mu_g^r, \mu_g^g)$. Eq. 5.21 can be proved by contradiction. Assume that $f(\mu_g^r, \mu_g^b) = g(\mu_g^r, \mu_g^g)$, one can see that this is possible only when both sides are equal to the same constant. If $f(\mu_g^r, \mu_g^b)$ is a constant, it implies that $\mu_g^r$ and $\mu_g^b$ are related, i.e. they are not independent which is a contradiction.

In order to prove $p'_1(x) \neq p'_3(x)$, it only needs to prove that $$\dfrac{\dfrac{m_w^r}{m_a^r} - \dfrac{m_w^g}{m_a^g}}{m_w^r - m_w^g} \neq \dfrac{\dfrac{m_w^g}{m_a^g} - \dfrac{m_w^b}{m_a^b}}{m_w^g - m_w^b}.$$

Similar to the above, it can be simplified to be Eq. 5.22. The proof of this inequality is very similar to that of Eq. 5.18.

$$\frac{|A'C'|}{|AC|} \neq \frac{|A'B'|}{|AB|}$$ (5.22)

Finally, to prove that $p'_2(x) \neq p'_3(x)$, it needs to prove that $$\dfrac{\dfrac{m_w^r}{m_a^r} - \dfrac{m_w^b}{m_a^b}}{m_w^r - m_w^b} \neq \dfrac{\dfrac{m_w^g}{m_a^g} - \dfrac{m_w^b}{m_a^b}}{m_w^g - m_w^b}.$$

It can be simplified to be the same as Eq. 5.18.

To conclude, for any $\Delta d \neq 0 \Rightarrow p'_1 \neq p'_2$, $p'_2 \neq p'_3$ and $p'_1 \neq p'_3$.

Now let's prove that $p'_1 \neq p'_2 \Rightarrow \Delta d \neq 0$, $p'_2 \neq p'_3 \Rightarrow \Delta d \neq 0$, and $p'_1 \neq p'_3 \Rightarrow \Delta d \neq 0$. The proof for $p'_1 \neq p'_2 \Rightarrow \Delta d \neq 0$ is provided, and the other two cases are very similar.

Let's rewrite Eq. 5.16 as follows:

$$\Delta d = \frac{(p'_1(x) - p_1(x))(m_w^r - m_w^g)}{\dfrac{m_w^r}{m_a^r} - \dfrac{m_w^g}{m_a^g}}$$ (5.23)

$$\Delta d = \frac{(p'_2(x) - p_2(x))(m_w^r - m_w^b)}{\dfrac{m_w^r}{m_a^r} - \dfrac{m_w^b}{m_a^b}}$$

It is known that $p_1(x) = p_2(x)$, and now that $p'_1(x) \neq p'_2(x)$, one can infer that at least one of $p'_1(x) - p_1(x) \neq 0$ or $p'_2(x) - p_2(x) \neq 0$ is true. Hence, it can be concluded that $\Delta d \neq 0$, because $m_w^r - m_w^g \neq 0$, $m_w^r - m_w^b \neq 0$.

Denote the distance between $p'_1$ and $p'_2$ as $d'_{12}$. In the following, Theorem 2 proves that it varies linearly with $\Delta d$.

Theorem 3 The distance $d'_{ij}$ where $i \neq j, i = \{1,2\}, j = \{2,3\}$, varies linearly with $\Delta d$.

Proof It is sufficient to focus on the x component of $d'_{12}, d'_{13}, d'_{23}$ because the y component is a linear function to x. From Eq. 5.14, the following equations can be derived.

$$p'_1(x) - p'_2(x) = p_1(x) - p_2(x) + \Delta d \left( \dfrac{\dfrac{m_w^r}{m_a^r} - \dfrac{m_w^g}{m_a^g}}{m_w^r - m_w^g} - \dfrac{\dfrac{m_w^r}{m_a^r} - \dfrac{m_w^b}{m_a^b}}{m_w^r - m_w^b} \right)$$ (5.24)

$$p'_1(x) - p'_3(x) = p_1(x) - p_3(x) + \Delta d \left( \dfrac{\dfrac{m_w^r}{m_a^r} - \dfrac{m_w^g}{m_a^g}}{m_w^r - m_w^g} - \dfrac{\dfrac{m_w^g}{m_a^g} - \dfrac{m_w^b}{m_a^b}}{m_w^g - m_w^b} \right)$$

$$p'_2(x) - p'_3(x) = p_2(x) - p_3(x) + \Delta d \left( \dfrac{\dfrac{m_w^r}{m_a^r} - \dfrac{m_w^b}{m_a^b}}{m_w^r - m_w^b} - \dfrac{\dfrac{m_w^g}{m_a^g} - \dfrac{m_w^b}{m_a^b}}{m_w^g - m_w^b} \right)$$

Because $p_1(x) = p_2(x) = p_3(x)$ and from Theorem 2 it is known that $$\frac{\frac{m_w^r}{m_a^r} - \frac{m_w^g}{m_a^g}}{m_w^r - m_w^g} \neq \frac{\frac{m_w^r}{m_a^r} - \frac{m_w^b}{m_a^b}}{m_w^r - m_w^b}, \frac{\frac{m_w^r}{m_a^r} - \frac{m_w^g}{m_a^g}}{m_w^r - m_w^g} \neq \frac{\frac{m_w^g}{m_a^g} - \frac{m_w^b}{m_a^b}}{m_w^g - m_w^b},$$

$$\frac{\frac{m_w^r}{m_a^r} - \frac{m_w^b}{m_a^b}}{m_w^r - m_w^b} \neq \frac{\frac{m_w^g}{m_a^g} - \frac{m_w^b}{m_a^b}}{m_w^g - m_w^b},$$

it can be concluded that $p'_1(x)-p'_2(x) \neq 0$, $p'_1(x)-p'_3(x) \neq 0$, $p'_2(x)-p'_3(x) \neq 0$ and varies linearly with $\Delta d$.

Theorem 4 There is a closed-form solution to $d_0$.

Proof From Eq. 5.13 together with $p_1(x)=p_2(x)$, one can derive Eq. 5.25, which concludes that $d_0$ has a closed-form solution.

$$d_0 = \frac{\left(\frac{d_1 m_w^r}{m_g^r} - \frac{d_1 m_w^g}{m_g^g}\right)(m_w^r - m_w^b) - \left(\frac{d_1 m_w^r}{m_g^r} - \frac{d_1 m_w^b}{m_g^b}\right)(m_w^r - m_w^g)}{\left(\frac{m_w^r}{m_a^r} - \frac{m_w^b}{m_a^b}\right)(m_w^r - m_w^g) - \left(\frac{m_w^r}{m_a^r} - \frac{m_w^g}{m_a^g}\right)(m_w^r - m_w^b)} \quad (5.25)$$

One can see that $d_0$ is easy to compute once the interface normal n is estimated.

Implementation Details

This embodiment depends on triple wavelength dispersion, which means that the object needs to emit three different kinds of colors (red, green and blue). One implementation to achieve this is simple and very practical. An LED projector (TI LightCrafter) is utilized to project three colors to illuminate the object. In this case, the object changes its original color to red, green and blue, to create the required triple wavelength dispersion.

When the observed pixel location is corrupted by noise, the three points $p_1$, $p_2$, $p_3$ may not be the same, in which case, $d_0$ is computed by minimizing the distances among these three points, which vary linearly with $\Delta d$ as proved in Theorem 2.

Figure 3B:
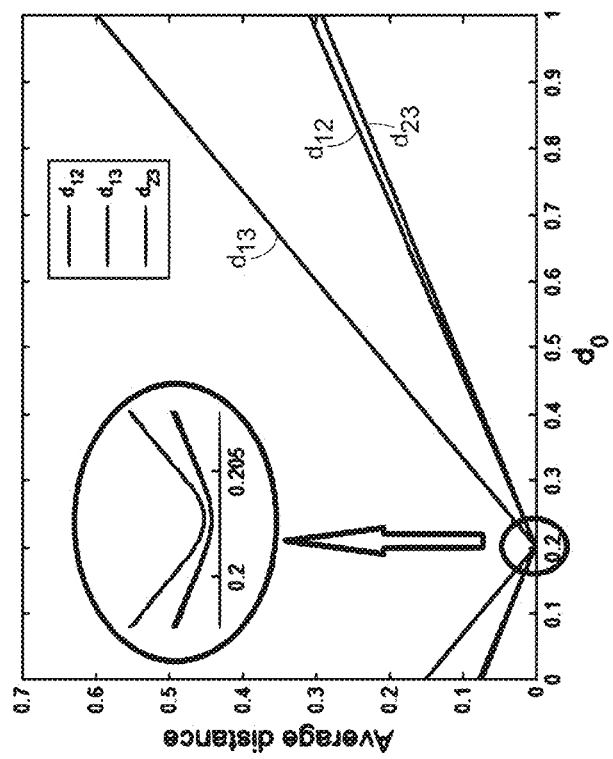
FIG. 3a and FIG. 3b demonstrate a procedure for determining the interface distance $d_0$ when the observed pixel is (a) noise free or (b) corrupted by Gaussian noise with variance $\sigma=0.5$ pixels according to an exemplary embodiment of the present invention.
Figure 3A:
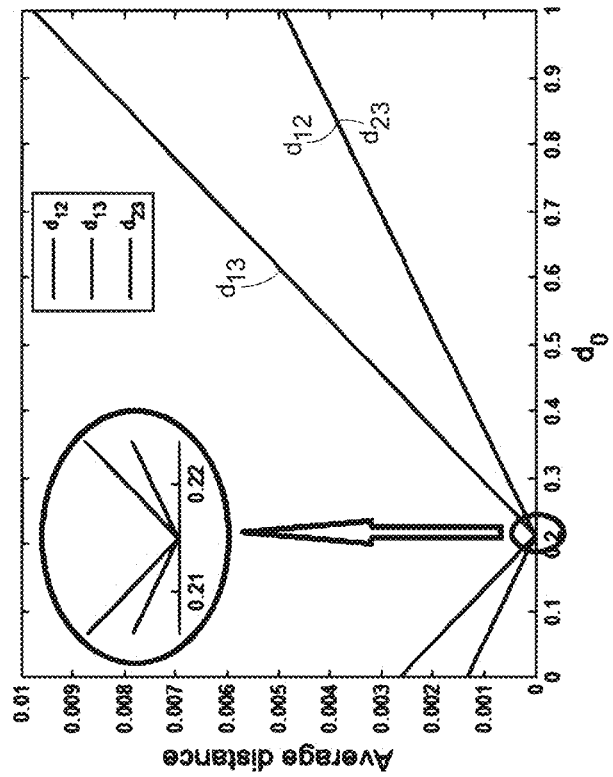
Figure 4A:
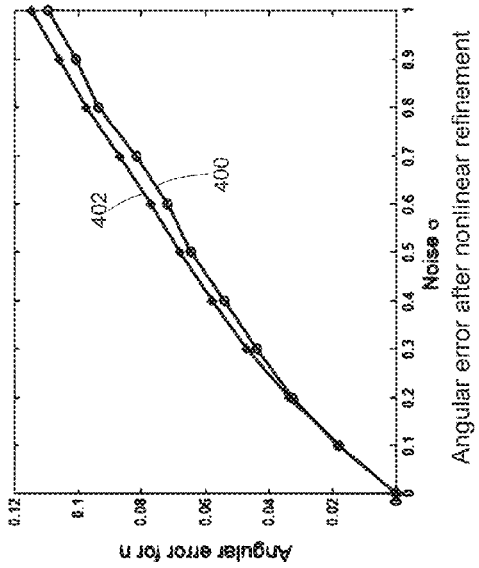
FIG. 4a, FIG. 4b, FIG. 4c, FIG. 4d show the results of simulated experiments calculating interface distance $d_0$ according to an exemplary embodiment of the present invention.
Figure 4B:
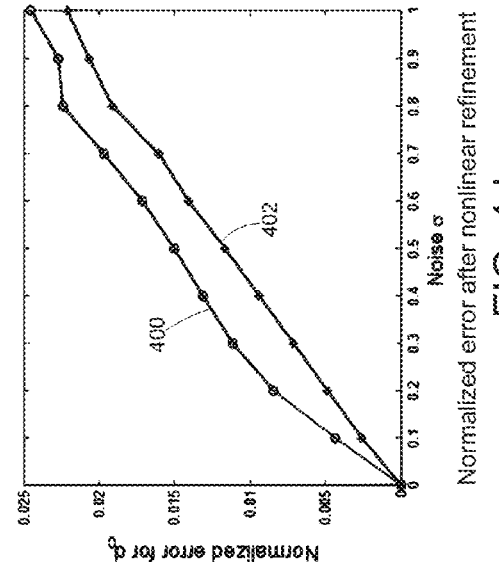
Figure 4C:
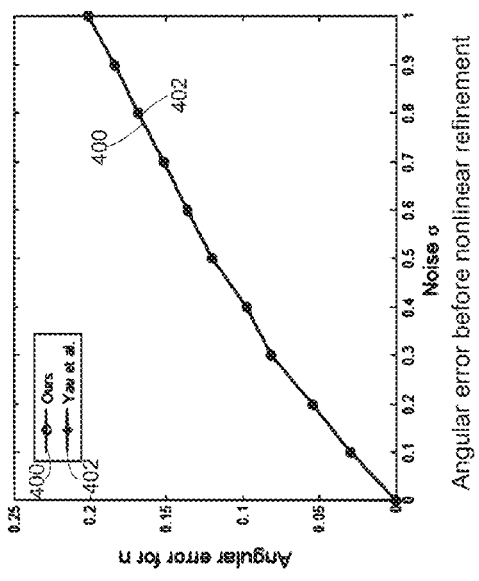
Figure 4D:
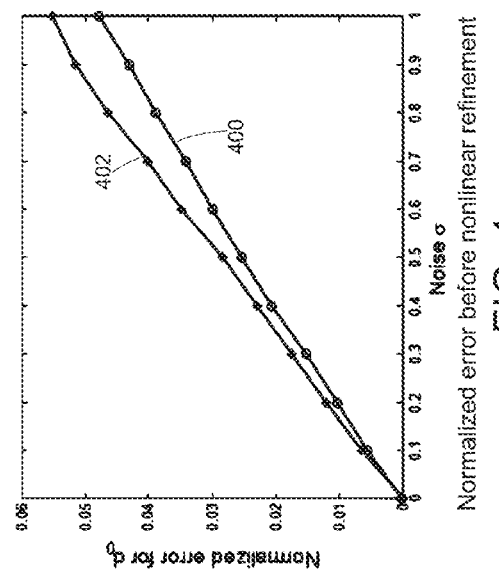

FIG. 3 demonstrates the procedure by showing a plot of $d_{12}, d_{13}, d_{23}$ when the observed pixel is (a) Noise free (b). Corrupted by Gaussian noise with variance $\sigma=0.5$ pixels. In particular, two datasets are selected in simulated experiments where one is noise free (FIG. 3a) and the other one corrupted with Gaussian noise (FIG. 3b). The x axis is the value for $d_0$ and the y axis shows the average of $d_{12}$, $d_{13}$ and $d_{23}$ of all the object points. It can be seen that the distance varies linearly with $\Delta d$ even in the presence of Gaussian noise. In the case when it is noise free, all three distances are zero at the minimum. Notice that the housing parameters are randomly generated in our simulated experiments, therefore the ground truth for $d_0$ is different for different datasets.

After the interface normal n and the distance $d_0$ are computed, a nonlinear refinement process is applied to further optimize the results. In particular, all the object points are reprojected to the image using all three wavelengths, and the reprojection error $$J = \sqrt{\frac{1}{M}\sum_{i=1}^{M}\sum_{j=R,G,B}(x_i(j) - \hat{x}_i(j))^2}$$

is minimized. M is the number of correspondences, x is the measured pixel location where $\hat{x}$ the reprojected. For example, the Matlab function fmincon may be applied in this step. When running the Matlab code on a desktop PC with Intel Core i7, solving the refractive normal takes about 1 second, the interface distance about 10 seconds, and the nonlinear optimization less than 2 minutes.

Experimental Results

Simulations and real experiments are designed to demonstrate the accuracy and robustness of the above-described method. In the experiments, it is assumed that the camera is mounted in a housing with a flat glass interface, and hence the light path from the camera to the object is air→glass→water, which is the most common scenario for the lab environment and for camera systems deployed underwater. The refractive index for air is 1.0 for all three wavelengths. In water, it is 1.343 for red, 1.337 for green and 1.332 for blue. In glass, it is 1.516 for red, 1.502 for green and 1.488 for blue.

Simulations

In simulated experiments, the focal length of the camera is set to be 5600 pixels. The resolution of the image is 5472×3648 with the principal point at the center of the image. The parameters are based on a Canon 6D camera used in the real experiments. It is assumed that there is no distortion in the image. In the experimental setup, the refractive normal n for each camera is randomly generated within a range of [10°,15°] away from the camera optical axis. Similarly, the interface distance $d_0$ is also randomly generated to be within 0.2:0.25 units. Notice that for camera systems that require to be deployed thousands of meters undersea, the glass is usually very thick. But for other systems designed for shallow water, the glass is much thinner. Therefore, the glass thickness $d_1$ varies depending on the depth where a camera system is deployed, it is set to be a random number between 0.02 and 0.5. One hundred object points are randomly generated and each placed at a random distance that is around 1.5 units from the camera. Each object point is observed at three different pixels and the pixel locations are corrupted by Gaussian noise (variance $\sigma^2$ pixels) and one hundred trials are performed for each noise setting. The results are evaluated as follows. Suppose the refractive normal recovered by the above method is $\hat{n}$ and the ground truth is n, then the angle between them is measured in degrees and called "angular error." For interface distance $d_0$, the normalized error is computed by $$\frac{|\hat{d}_0 - d_0|}{d_0},$$

where |•| denotes the absolute value. It can be seen that all the measures indicate errors. Hence, a lower value in the curves indicates a better result.

FIG. 4 shows the results of simulated experiments FIG. 4(a, b) showing angular error before and after nonlinear refinement and FIG. 4(c, d) showing normalized error for $d_0$ before and after nonlinear refinement. The results are compared with that of the method [17] that is currently known to be the best underwater camera calibration method. The first line 400 indicates the results of the above-described method according to this embodiment of the invention, and a second line 402 indicates the results of the related art method [17] by Yao et al. The implementation of [17] requires that the 3D geometry of the object to be known. To achieve that, it is assumed that the 3D coordinates of the object points are known in the world coordinate system. It can be seen that this is impossible for an arbitrary 3D object. From the results it can be seen that comparing with [17], the method of this embodiment can achieve similar accuracy even though it does not require the 3D geometry of the object.

Importance of Calibration

The importance of the camera housing calibration is demonstrated by showing the impact of the housing parameters to the final 3D reconstruction. The same configuration and parameters are used as the previously mentioned simulated experiments. Using the observed pixel locations with triple wavelength dispersion along with the ground truth housing parameters, these 3D object points can be computed without any error. However, once the housing parameters are changed, errors would exist in the computed 3D object points. The ground truth coordinates of each object point are denoted as P, and the coordinates computed by the changed parameters as $\hat{P}$. The distance between these two points is obtained and averaged for all the 3D points, which is denoted as D. It can be seen that D is the error when compared with the ground truth.

Figure 5:
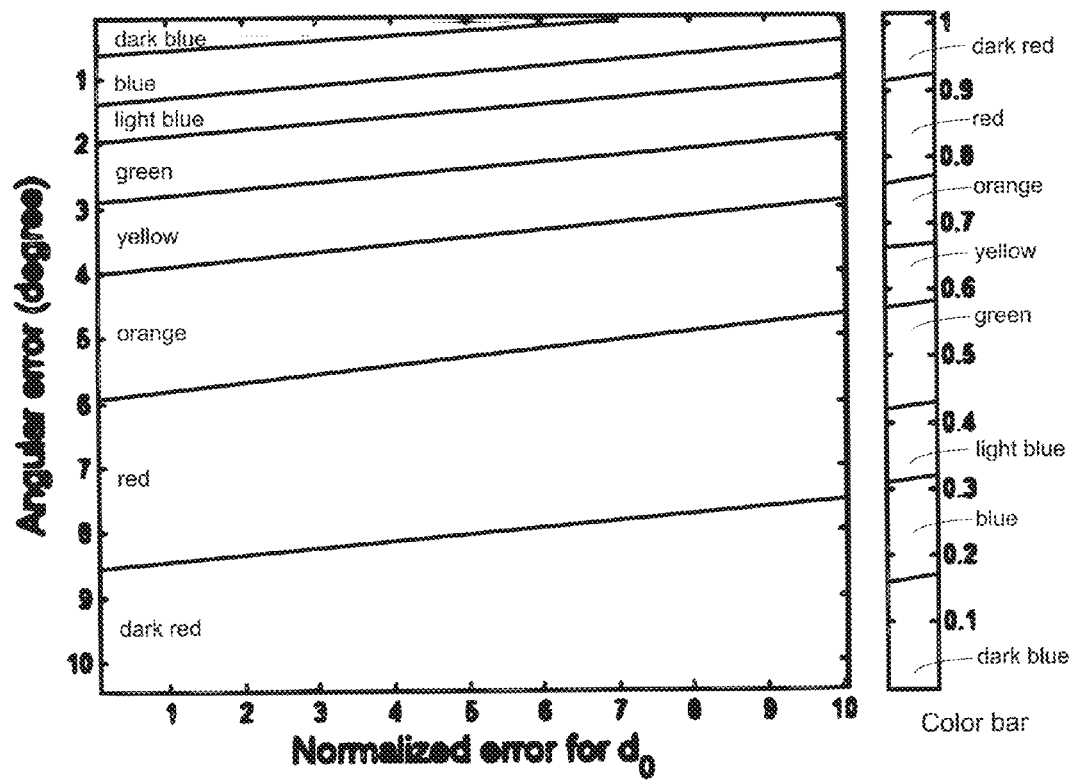
FIG. 5 shows the error D impacting the housing parameters to the final 3D reconstruction results according to an exemplary embodiment of the present invention.

FIG. 5 shows the error D impacting the housing parameters to the final 3D reconstruction results. In particular, the x axis denotes the normalized error for $d_0$ in percentage, and the y axis denotes the angular error of the interface normal. The error D is computed when the angular error is less than 10.5° and the error for $d_0$ is smaller than 10%. FIG. 5 is color coded where blue indicates a smaller error and red a larger error. The color bar is also attached to the right of this figure. The figure shows that when the interface normal is 10° off from the ground truth and $d_0$ is 10% off, the error D is around 1 unit. This error is very large, because each of the 3D points in the ground truth is about 1.5 unit away from the camera. In other words, the housing parameters are important to the 3D reconstruction result.

Real Data

Figure 6A:
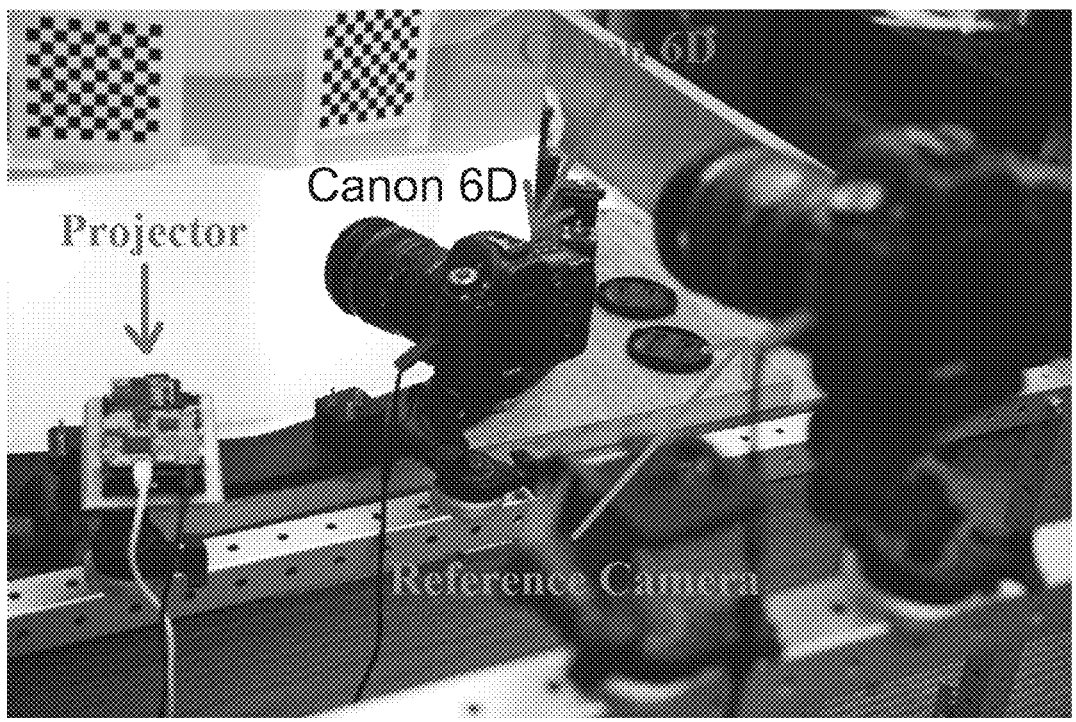
FIG. 6a and FIG. 6b show the setup utilized to carry out real experiments in a lab environment according to an exemplary embodiment of the present invention.
Figure 6B:
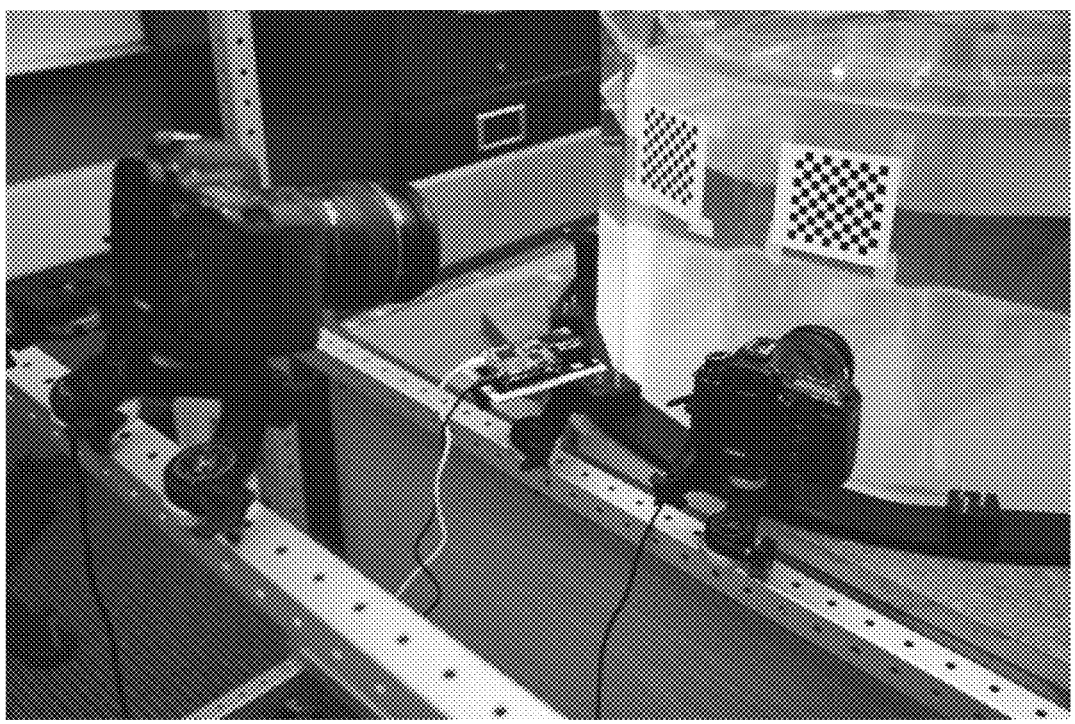

Real experiments are carried out in a lab environment and the setup is shown in FIG. 6. A Canon 6D camera, with a resolution of 5472×3648, is placed in front of a plexiglass tank. A projector is used to project the red, green and blue lights onto the object. A reference camera, which is another Canon 6D camera, is used to obtain the ground truth of the refractive normal n and the interface distance $d_0$. In particular, the reference camera focuses on the checkerboard pattern which is pasted on the interface. Therefore, the transformation between the coordinate system of the checkerboard and that of the reference camera can be computed through calibration. Once the two cameras are calibrated in air, the transformation between the coordinate systems of the checkerboard and of the cameras facing the interface can be computed. As a result, the ground truth of n and of $d_0$ can be obtained, and hence the results can be evaluated against them. The thickness of the glass is measured by a ruler. In addition to using a Canon 6D camera, the same experiment was also performed using a Point Grey Blackfly mono camera with a resolution of 2448×2048. Since the method presented in [17] requires a light box as a calibration target while our experiments use an arbitrary scene, we do not compare with this method.

Figure 7B:
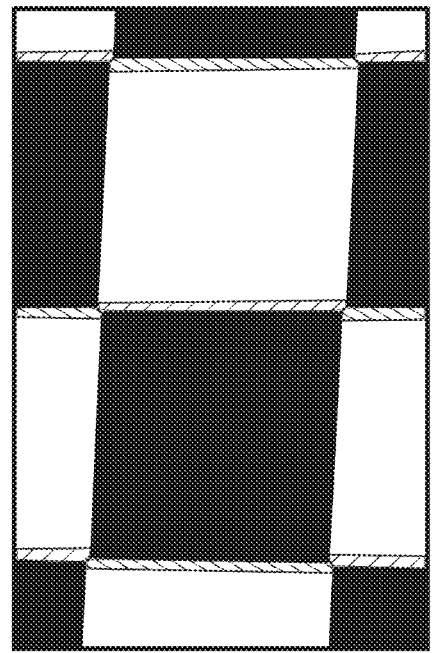
FIG. 7a and FIG. 7b show the dispersion effect observed by (a) Canon 6D camera and (b) Blackfly camera.
Figure 7A:
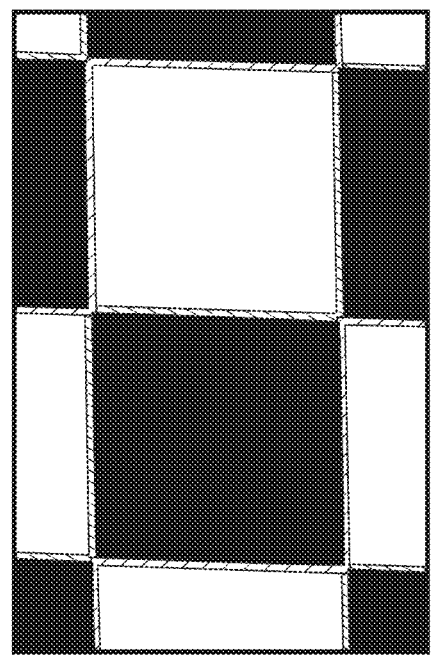
Figure 8B:
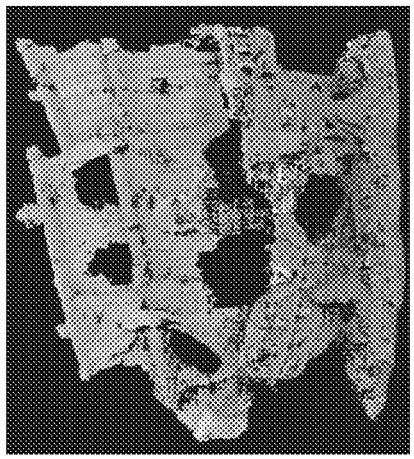
FIG. 8a, FIG. 8b, FIG. 8c, FIG. 8d, FIG. 8e, FIG. 8f, FIG. 8g, FIG. 8h, FIG. 8i, FIG. 8j, FIG. 8k, FIG. 8l show original images, 3D reconstruction results, and error plots as obtained in real experiments in a lab environment for three different scenes when utilizing a Canon camera according to an exemplary embodiment of the present invention FIG. 9a, FIG. 9b, FIG. 9c, FIG. 9d, FIG. 9e, FIG. 9f, FIG. 9g, FIG. 9h, FIG. 9i, FIG. 9j, FIG. 9k.
Figure 8D:
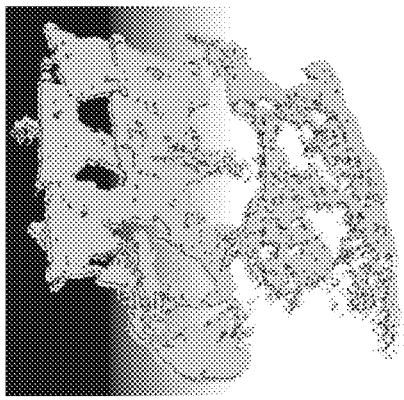
Figure 8A:
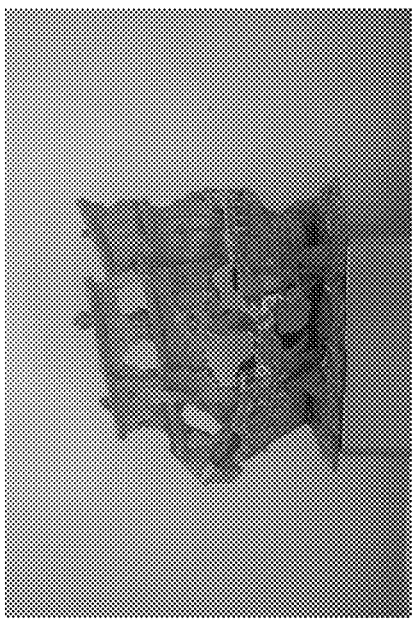
Figure 8C:
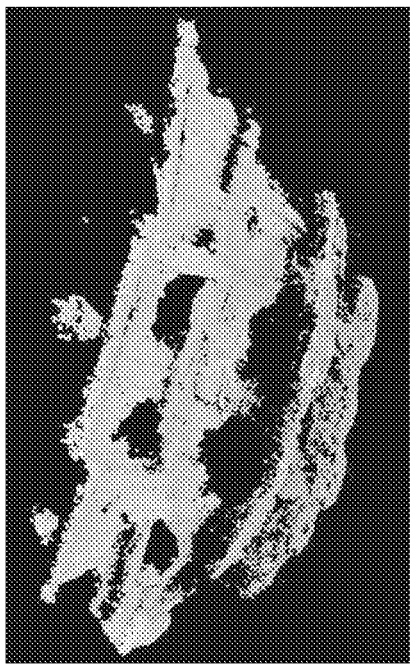
Figure 8E:
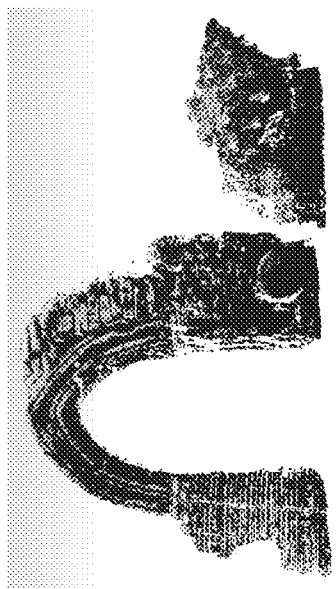
Figure 8F:
Figure 8G:
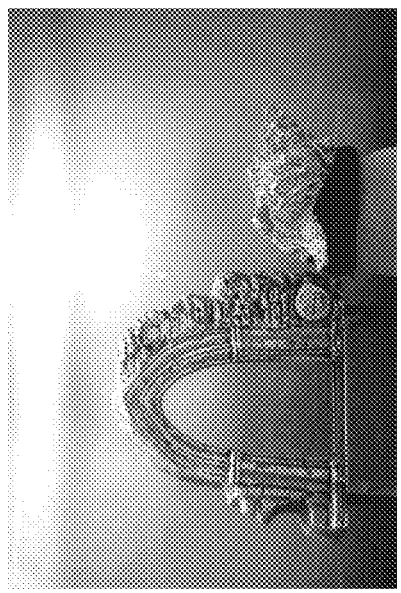
Figure 8H:
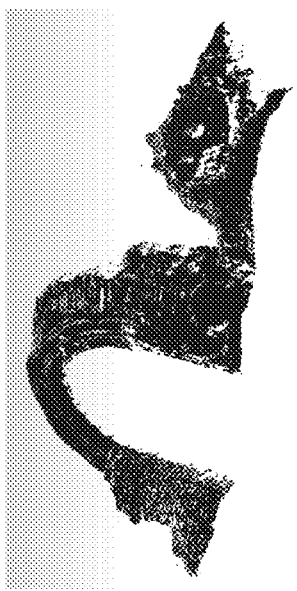
Figure 8J:
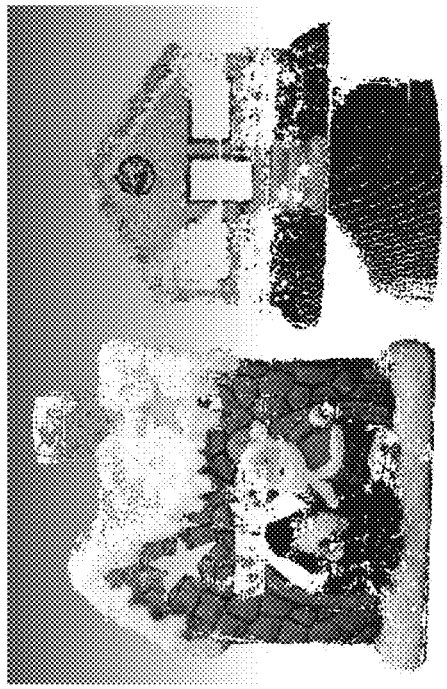
Figure 8L:
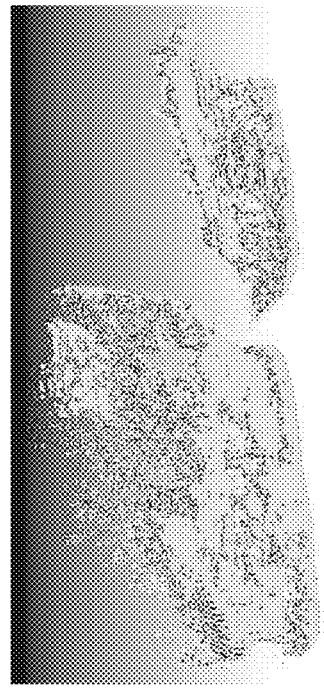
Figure 8I:
Figure 8K:
Figure 9B:
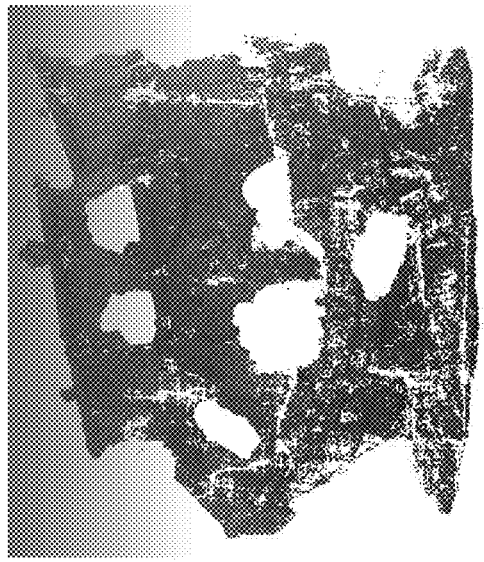
FIG. 9l shows original images, 3D reconstruction results, and error plots as obtained in real experiments in a lab environment for three different scenes when utilizing a Blackfly camera according to an exemplary embodiment of the present invention
Figure 9D:
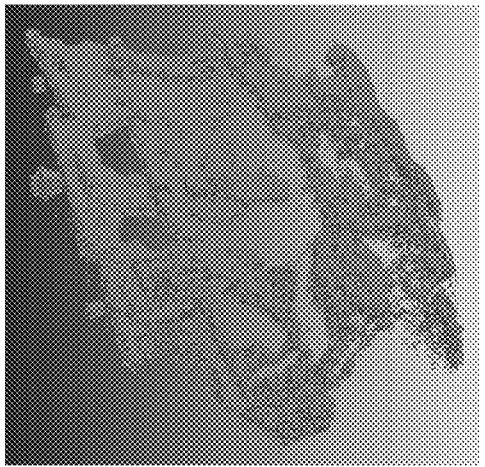
Figure 9A:
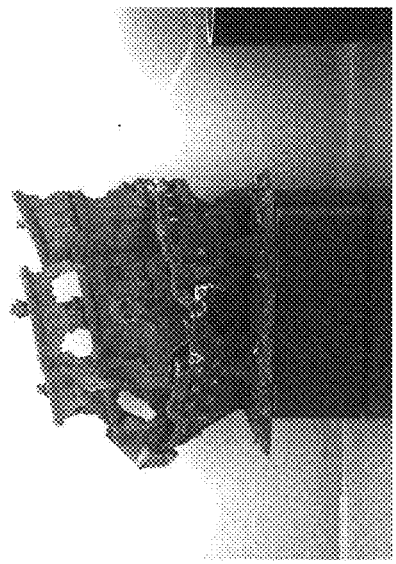
Figure 9C:
Figure 9F:
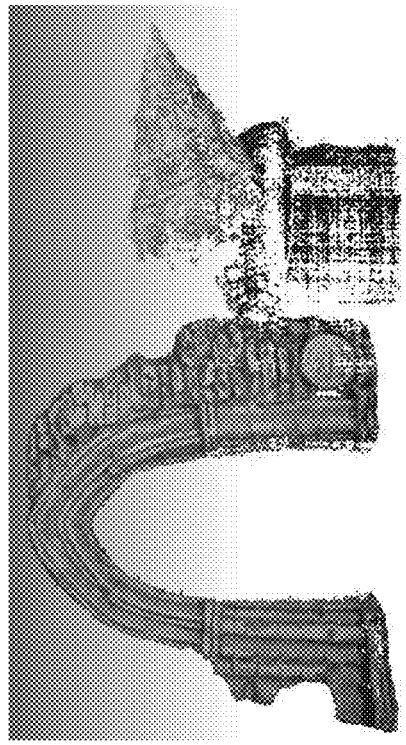
Figure 9H:
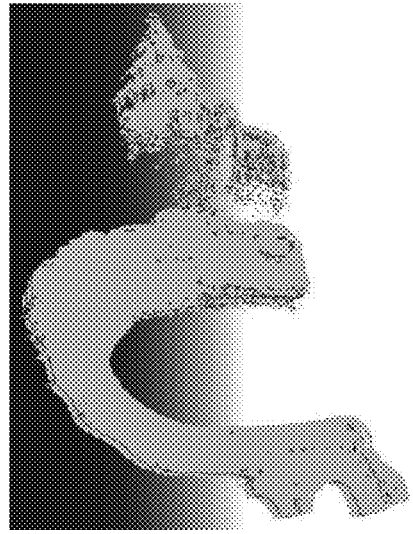
Figure 9E:
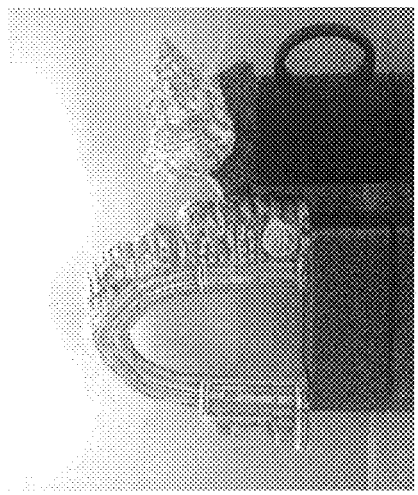
Figure 9G:
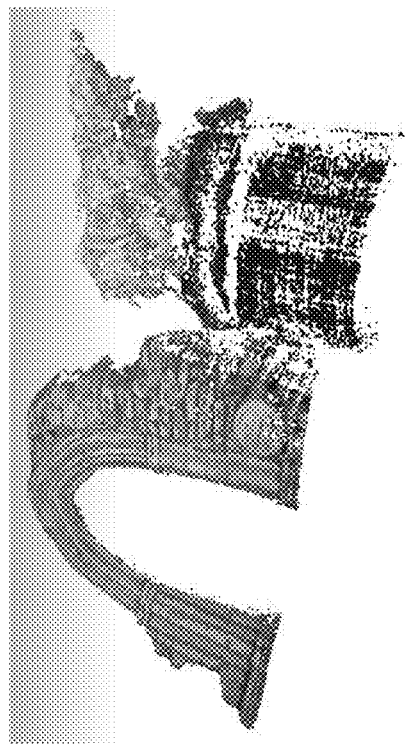
Figure 9J:
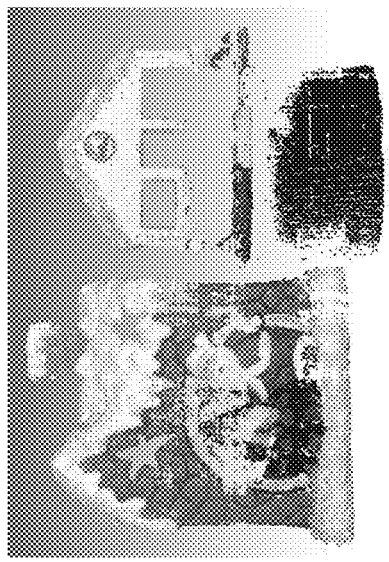
Figure 9L:
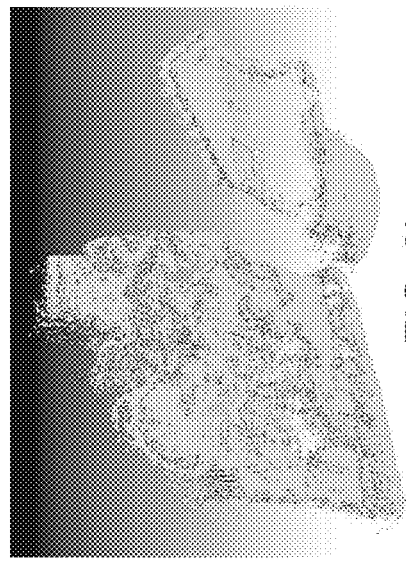
Figure 9I:
Figure 9K:
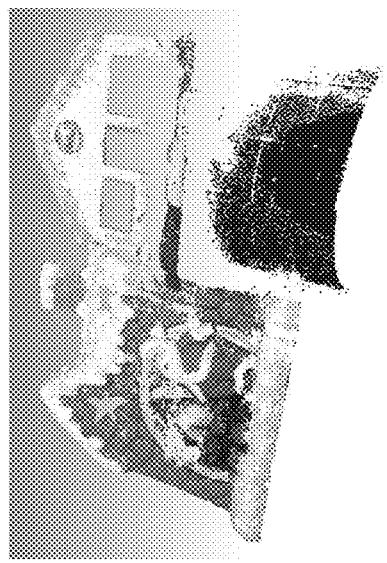
Figure 10:
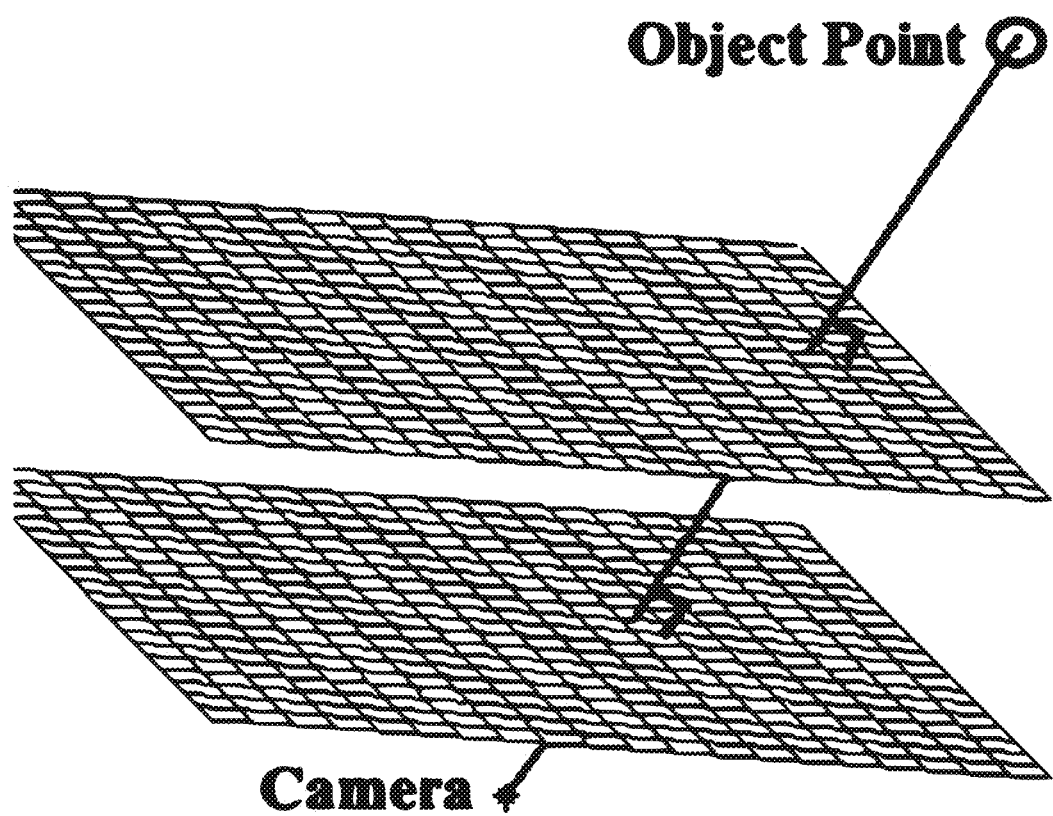
FIG. 10 shows the dispersion of all the points within a circle in the center of the sensor is less than one pixel in the image and is very small compared to the FOV of the camera.

FIG. 7 shows the dispersion effect observed by (a) Canon 6D camera and (b) Blackfly camera. We first demonstrate that the dispersion effect can be observed by both types of cameras. A checkerboard pattern is placed in water and two images are captured when it is illuminated by the red and blue lights from the projector. If the dispersion were not observed, then the edge of the grids would align perfectly with each other in these two images. We superimpose the blue image onto the red image and the results are shown in FIG. 7. We can see that the edges do not align well which indicates that the dispersion between red and blue can be observed.

The procedures of the experiment can be described as follows. (1) The lens chromatic aberration (CA) in air is first corrected using the same method presented in [17]. Throughout the experiments, it was found that the error in $d_0$ is about 10 times larger without correction than with CA correction. (2) Red, green and blue patterns are projected onto an arbitrary scene and for each pattern, one image is captured. (3) SIFT descriptors are compared among the three images to find SIFT matches. The refractive normal and the interface distance are estimated using the detected SIFT matches. (4) Gray code [15] patterns are projected using red, green and blue in order to establish dense correspondence. The dispersion effect from the projector can be safely ignored due to its low resolution.

There are three scenes for each type of camera. FIG. 8 are for the Cannon 6D camera and FIG. 9 are for the Blackfly camera. For each scene, the first image (a+e+i) is captured under ambient light. FIG. 9(a+e+i) have no color because the camera is a mono camera. The next two images (b,c+f, g+j,k) are the reconstructed 3D point clouds using the dense correspondences established from gray code and the housing parameters estimated by the method of the above-described embodiment. It can be seen that many details are preserved in the 3D model. It is worthy to note that even though the image taken by the Blackfly camera has no color, the images captured when the scene is illuminated under the red, green and blue light can be combined to form a color image. The method presented in [5] is followed to compare the 3D point clouds and that of the ground truth. That is, for each scene, the last image (d+h+l) is the 3D point cloud that is reconstructed using the estimated parameters shown in foreground, and using the ground truth parameters in background. It can be seen that the results are very close to the ground truth. The evaluation of the result for these scenes is shown in Table 1. The errors for the parameters are very close to the ones reported in [17] using a calibration target, and are consistent with our simulated results. The results also indicate that the method is practical. Besides the parameters, the averaged distance between our 3D points and the ground truth is also computed, and is denoted as "3D err" in the table. The value of the 3D error is very small, which indicates that the method can generate accurate results. Our real experiments also demonstrate that a mono camera can be used because the dispersion effects can be observed. Moreover, by combining the three images captured when the scene is illuminated by the red, green and blue patterns, we can get the color information of every pixel.

TABLE 1

Evaluation of method results against the ground truth.

|  | Err in $d_0$ | Err in n (deg) | 3D err (mm) |
| --- | --- | --- | --- |
| Canon + Boat (FIG. 8b, c) | 1.733% | 0.835 | 1.773 |
| Canon + Coral (FIG. 8f, g) | 1.654% | 0.985 | 1.812 |
| Canon + House (FIG. 8j, k) | 1.813% | 0.907 | 1.828 |
| Blackfly + Boat (FIG. 9b, c) | 2.189% | 1.248 | 2.648 |
| Blackfly + Coral (FIG. 9f, g) | 2.318% | 1.093 | 2.393 |
| Blackfly + House (FIG. 9j, k) | 2.276% | 1.447 | 2.729 |

Handling outliers. The method can handle outliers easily. When examining a pair of matched SIFT descriptors, they are regarded as outliers if the distance of matched pixel locations in these three images is larger than a threshold. For the Canon 6D camera, the threshold is 10 pixels and 5 for the Blackfly camera. The reason is that a matched SIFT descriptor must be from the same physical point, even though it is observed at different pixel locations due to dispersion, the difference of pixel location should not be too large.

TABLE 2

Comparison of different methods.

| | Initialization | Refinement | Shortcomings |
|---|---|---|---|
| Category 1: [7, 8] | Manual guess [7], Initialization for the housing parameters is not shown [8] | Nonlinear optimization | Need to estimate relative camera pose, SIFT matches come from the regions viewed by both cameras only, and the results using real data are not compared to the ground truth. |
| Category 2: [1, 17] | Solving linear equations | Nonlinear optimization | Require calibration object. |
| Method according to above-described embodiment of the present invention | Solving linear equations and closed-form solution | Nonlinear optimization | See text for details. |

Discussions and Limitations

Most existing methods can be grouped into two categories. The methods in the first category require at least two cameras viewing the same scene, and estimate parameters from a set of feature matches. Two representative methods are [7, 8]. The methods in the second category perform single camera calibration with a calibration target. Two representative methods are [1, 17].

The method according to the above-described embodiment is compared with some recent methods in Table 2 to highlight exemplary advantages. First, compared with the methods in the first category, it is not needed to estimate the relative camera pose which largely reduces the number of parameters to be optimized. Moreover, the method of the above-described embodiment can use SIFT matches from the entire field of view of the camera because we use only one camera. Last but not least, the initialization is more accurate than using a manual guess such as in [7]. The nonlinear optimization is more efficient compared to that in [7]. The method in [8] claims that it can solve three different problems. However, the initialization for the housing parameters is not shown. As well, in their simulations, the results of the estimated the housing parameters are not shown or evaluated.

While the method of the above-described embodiment is motivated by [17], it is not a trivial extension. Ref. [17] uses two wavelengths dispersion to compute the interface normal while triple wavelengths are utilized in the above-described embodiment to compute $d_o$. It has been shown earlier that using two wavelengths will fail to compute a unique $d_o$. The method of the above-described embodiment produces results with similar accuracy comparing to that in [17], which means that it is more accurate than that in [1]. Comparing to [17], one advantage of our method is that we do not require any calibration target. In particular, triple wavelength dispersion is beneficially exploited, which not only requires no calibration target but also provides an easy to compute closed-form solution of the interface distance. The method of above-described embodiment projecting red, green and blue patterns to the object is also unique, which removes the requirement for an object of known geometry to emit light with three different wavelengths. Such an implementation is obviously better in many applications than the custom-built light box [17]. As well, unlike the related art methods described above in the background section, the method of the above-described embodiment can perform 3D reconstruction from a single camera.

There is a limitation of the above-described method, which is demonstrated in FIG. 9. In particular, when the ray connecting the camera center and the object point is perpendicular to the refractive interface, then this ray undergoes no refraction at all. In this case, there is no dispersion observed which means that our method does not apply. However, notice that there is only one point in the entire field of view (FOV) of the camera where this would happen. In FIG. 9, it is assumed that the dispersion of all the points within the green circle is less than one pixel in the image, and it is demonstrated that this green circle is very small comparing to the FOV of the camera. The configuration of the simulated experiments is utilized and it is assumed that the z component of all the object points is 1.2 units. In this case, the FOV of the camera is about 0.9×0.6 units. The radius of the green circle is therefore found to be 0.042 unit, which means that there is about 1.03% of the FOV of the camera where the dispersion is less than one pixel. Obviously this area is very small.

Underwater Camera System

Figure 11:
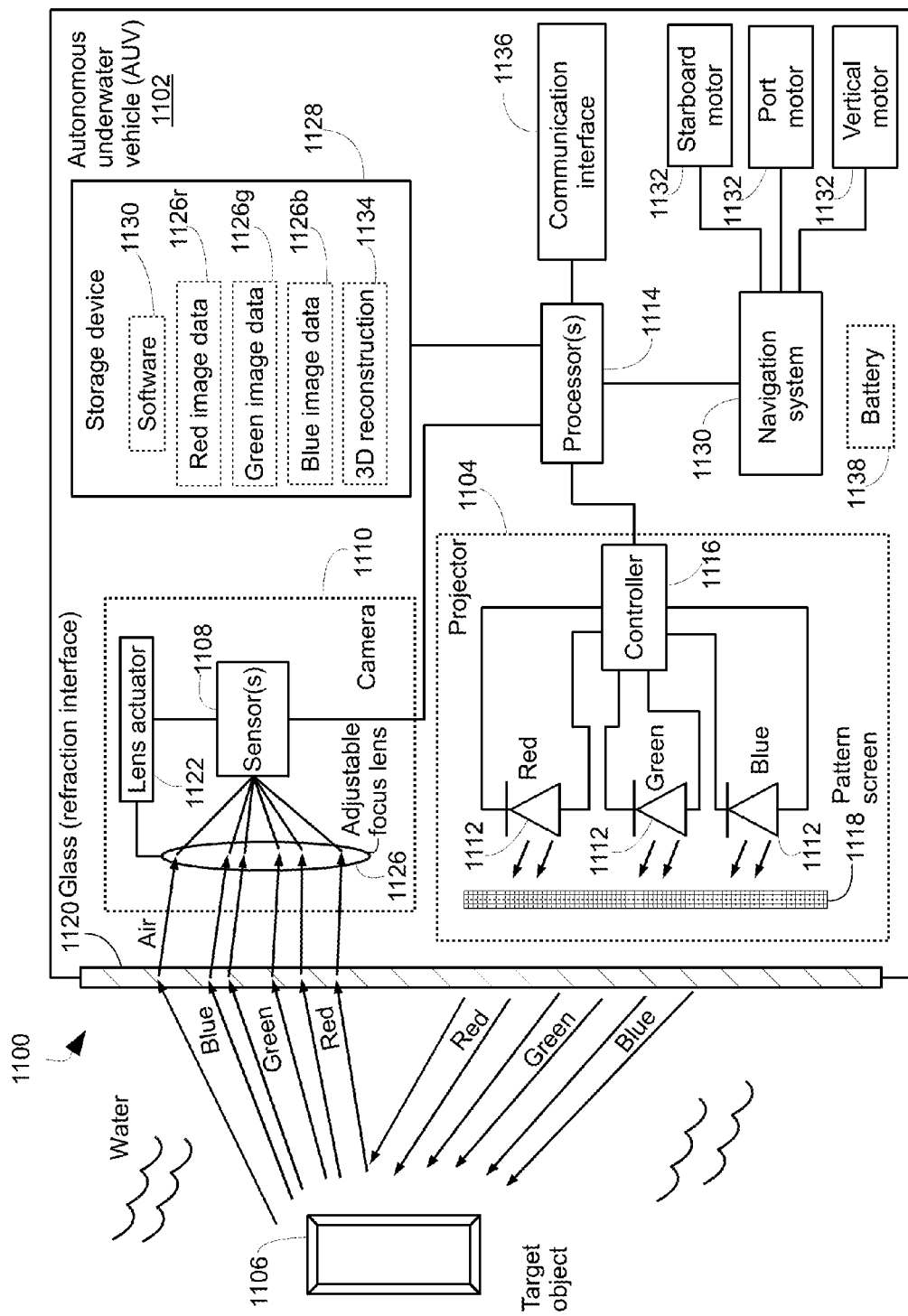
FIG. 11 shows a block diagram of an underwater camera system integrated into an autonomous underwater vehicle (AUV) according to an exemplary embodiment of the invention.

FIG. 11 shows a block diagram of an underwater camera system 1100 integrated into an autonomous underwater vehicle (AUV) 1102 according to an exemplary embodiment of the invention. The vehicle 1102 includes a projector 1104 for projecting electromagnetic radiation of at least three different wavelengths onto a target object 1106. One or more sensors 1108 of a camera 1110 receive reflected light at each of the wavelengths from the target object 1106. In this embodiment, the projector 1104 includes multiple light emitting diodes (LEDs) 1112, specifically red, green, and blue LEDs 1112. One or more processors 1114 are coupled to a controller 1116 of the projector 1104 in order to selectively turn on LEDs 1112 at different color wavelengths. A pattern screen 1118 shapes the light into an appropriate pattern such as Gray code [15] patterns. The reflected light from the object 1106 returns to the vehicle 1102 and crosses a refraction interface formed by a panel of glass 1120 of a predetermined thickness. The thickness may be dependent on the depth of the vehicle 1102 underwater in a known manner. A lens actuator 1122 focuses the adjustable focus lens 1124 and the sensor(s) 1108 store image data 1126r, 1126g, 1126b in the storage device 1128 for processing by the processors 1114 according to software 1130 instructions loaded from the storage device 1128 and executed by the processors 1114. Electrical power is provided by an onboard battery 1138.

In this description the plural form of the word "processors" will be utilized for the one or more processors 1114 of the vehicle 1102 as it is common for the CPU of an embedded system to have multiple processors 1114 (sometimes also referred to as cores); however, it is to be understood that a single processor 1114 may also be configured to perform the described functionality in other implementations.

During operation, the vehicle 1102 is submerged in water and a navigation system 1130 drives a plurality of motors 1132 moving the vehicle 1102 underwater to find a target object 1106 for imaging. Three images are taken corresponding three different wavelengths of light reflected off the target object. The processors 1114 then process the three sets of image data 1126r, 1126g, 1126b in order to generate a 3D reconstruction 1134 of the target object 1106 according to the above-described method—also see FIG. 12 for a summary of operations performed by the processors 1114.

While underwater or after the vehicle 1102 has returned to ship or base, an operator may download the various image data 1126r, 1126g, 1126b and 3D reconstruction 1134 via a communication interface 1136. Navigation targets and waypoints for a next run may also be loaded via the communication interface 1136. Examples of communications interface 1136 include serial ports, Bluetooth, Ethernet, WiFi, etc.

Figure 12:
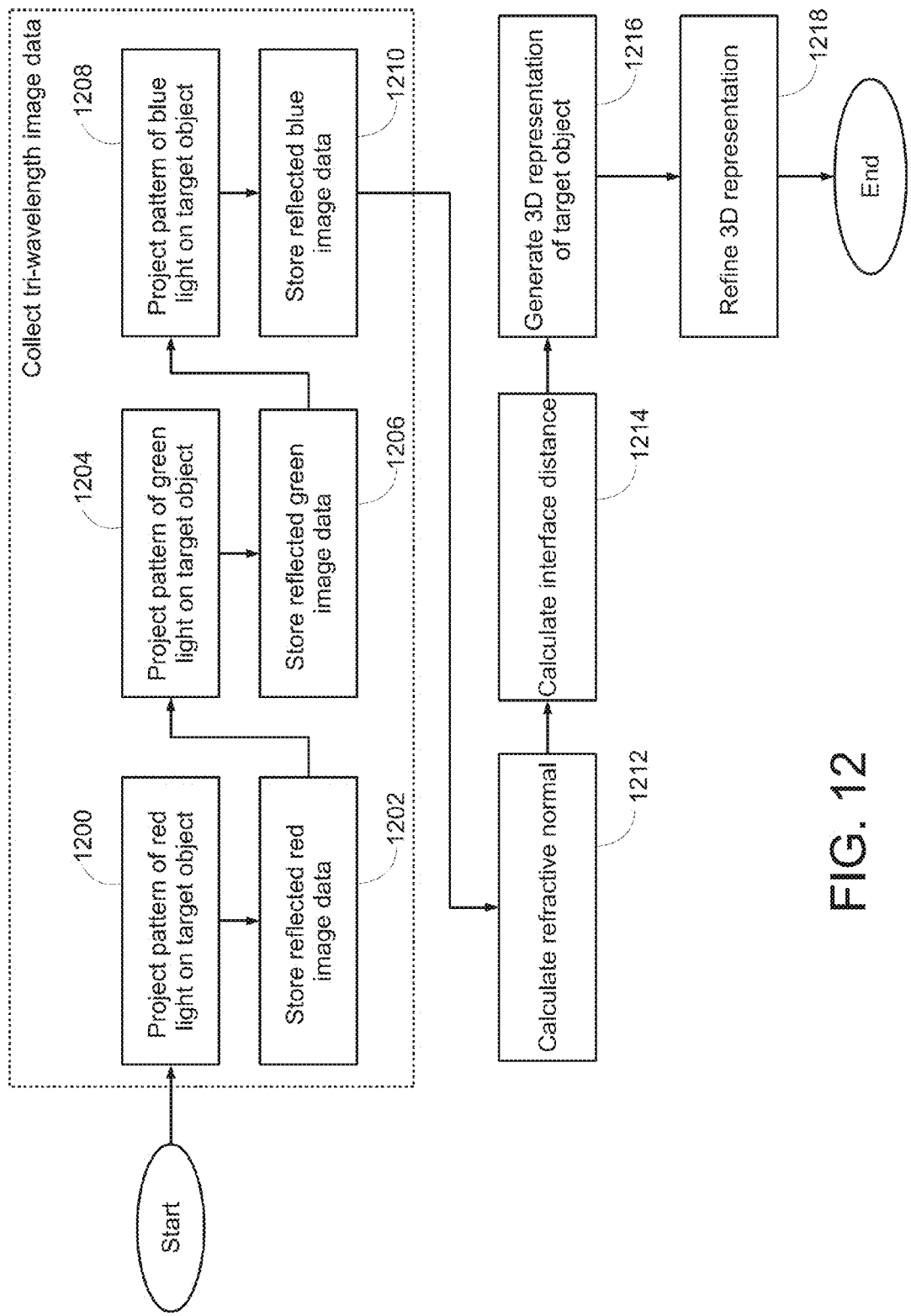
FIG. 12 is a flowchart of operations performed by the one or more processors of FIG. 11 in order to generate a 3D representation of an underwater target object according to an exemplary embodiment of the invention.

FIG. 12 is a flowchart of operations performed by the one or more processors 1114 of FIG. 11 in order to generate a 3D representation 1134 of an underwater target object 1106 according to an exemplary embodiment of the invention. The steps of FIG. 12 are not restricted to the exact order shown, and, in other embodiments, shown steps may be omitted or other intermediate steps added. In this embodiment, the one or more processors 1114 of the autonomous underwater vehicle 1102 of FIG. 11 execute software instructions 1130 loaded from the storage device 1128 in order to cause the processors 1114 to perform the illustrated steps. The process begins when a 3D reconstruction process is triggered. In one embodiment this occurs after the vehicle 1102 has navigated to a target object 1106 underwater. The one or more processors 1114 trigger the process of FIG. 11 to start.

At step 1200, the processors 1114 send commands to the projector 1104 thereby causing the projector 1104 to shine a pattern of red light on the target object 1106.

At step 1202, the sensors 1108 capture reflected red light from the target object 1106 and store corresponding the red image data 1126r into the storage device 1128.

At step 1204, the processors 1114 send commands to the projector 1104 thereby causing the projector 1104 to shine a pattern of green light on the target object 1106.

At step 1206, the sensors 1108 capture reflected green light from the target object 1106 and store corresponding the green image data 1126g into the storage device 1128.

At step 1208, the processors 1114 send commands to the projector 1104 thereby causing the projector 1104 to shine a pattern of blue light on the target object 1106.

At step 1210, the sensors 1108 capture reflected blue light from the target object 1106 and store corresponding the blue image data 1126b into the storage device 1128.

At step 1212, the processors 1114 take advantage of the triple wavelength dispersion present in the image data 1126r, 1126g, 1126b in order to calculate the refractive normal n as described above in the section entitled, "Interface Normal Computation".

At step 1214, the processors 1114 calculate the interface distance $d_0$ according to the refractive normal n and based on the assumption that triple wavelength dispersion is observed as described above in the section entitled, "Interface Distance Computation".

At step 1216, the processors 1114 generate and store in the storage device 1128 a 3D representation 1134 of the target object 1106 according to the image data 1126r, 1126g, 1126b once the interface normal n and distance $d_0$ are known as described above in the section entitled, "3D Reconstruction".

At step 1218, the processors 1114 perform a nonlinear refinement process is applied to further optimize the results as described above in the section entitled, "Implementation Details".

Conclusion

A new method to compute the interface distance and a new 3D reconstruction method using a single camera is disclosed. It is firstly demonstrated that the refractive normal can be estimated using dispersion. After that, a mathematical proof and derivation of a closed-form solution of the interface distance by utilizing triple wavelength dispersion is provided. Simulated and real experiments are performed to evaluate the correctness and robustness of our method. All the experimental results are evaluated against the ground truth, and the simulation results are compared with the state-of-the-art method [17]. The results indicate that the disclosed method has a high accuracy and is practical since it works with an arbitrary 3D scene.

In an exemplary embodiment, an underwater camera system includes a projector operable to project a pattern of electromagnetic radiation toward a target object. The electromagnetic radiation comprises at least three different wavelengths. A sensor directed toward the target object receives reflected electromagnetic radiation from the target object and stores corresponding image data received from the sensor. One or more processors process the image data to compute a refractive normal according to a wavelength dispersion represented by differences in the image data, and to compute an interface distance corresponding to a distance from a center point of the sensor to a first refractive interface nearest the sensor according to the refractive normal. The processors generate a 3D representation of the target object by back projecting each pixel of the image data at the first, second, and third wavelengths in order to determine an object point location according to the refractive normal and interface distance.

Although the invention has been described in connection with preferred embodiments, it should be understood that various modifications, additions and alterations may be made to the invention by one skilled in the art without departing from the spirit and scope of the invention as defined in the appended claims. For instance, rather than projecting three separate wavelengths of light on the target object in steps 1200, 1204, 1208 one after the other, in another embodiment all three wavelengths are projected simultaneously and the three sensors are used where each sensor is only operable to detect and store a particular wavelength of light. For instance, filters may be positioned in front of each sensor to only allow a particular wavelength of light to pass. Projecting the at least three wavelengths onto the target object at the same time and likewise capturing the three image data sets at the same time is beneficial when either the target object and/or the camera vehicle is in motion at the time the images are taken.

In another example modification, rather than an autonomous underwater vehicle, a remotely operated vehicle (ROV) may be employed in a similar manner. In some embodiments, the 3D representation of the target object is generated by the vehicle's on-board processors in real-time. However, it is not required that the image processing steps 1212, 1214, 1216, 1218 be performed by processors within the vehicle. In other embodiments, the vehicle camera system merely captures the triple wavelength image data and then communicates these data sets back to a computer server located on ship, a research station, or any other location for processing. This type of a distributed system is beneficial to reduce the processing requirements and battery drain of the vehicle. The more processor intensive tasks are offloaded to another standalone computer server.

In yet another example modification, other wavelengths of electromagnetic radiation other than red, green, and blue light may be employed. To ensure sufficient triple wavelength dispersion, the three wavelengths are separated by at least 100 nanometers in some embodiments.

The above-described calculations, formulas, flowchart, methods, examples, etc. may be implemented by software executed by one or more processors operating pursuant to instructions stored on a tangible computer-readable medium such as a storage device to perform the above-described functions. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the underwater camera system as a result of executing the instructions.

In other embodiments, rather than being software modules executed by one or more processors, the above-described calculations, formulas, flowchart, methods, examples, etc. may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A camera system comprising:
a projector selectively operable to project a pattern of electromagnetic radiation toward a target object, the electromagnetic radiation comprising at least three different wavelengths including a first wavelength, a second wavelength, and a third wavelength;
a sensor directed toward the target object to receive reflected electromagnetic radiation from the target object;
a storage device; and
one or more processors coupled to the projector, sensor, and storage device;
wherein, by the one or more processors executing software loaded from the storage device, the one or more processors are operable to:
send one or more control signals to the projector causing the projector to project the pattern of electromagnetic radiation toward the target object at each of the first, second and third wavelengths;
store into the storage device a plurality of image data received from the sensor, the image data corresponding to the reflected electromagnetic radiation detected by the sensor at each of the first, second, and third wavelengths;
process the image data to compute a refractive normal according to a wavelength dispersion represented by differences in the image data at each of the first, second, and third wavelengths;
process the image data to compute an interface distance corresponding to a distance from a center point of the sensor to a first refractive interface nearest the sensor according to the refractive normal;
generate a 3D representation of the target object by back projecting each pixel of the image data at the first, second, and third wavelengths in order to determine an object point location according to the refractive normal and interface distance; and
store the 3D representation of the target object in the storage device.

2. The camera system of claim 1, wherein the electromagnetic radiation has wavelengths within 400-700 nanometers.

3. The camera system of claim 1, wherein each of the first wavelength, second wavelength, and third wavelength are separated by at least 100 nanometers.

4. The camera system of claim 1, wherein the projector comprises at least three light emitting diodes each respectively emitting one of the first, second, and third wavelengths of electromagnetic radiation.

5. The camera system of claim 1, wherein the first wavelength corresponds to red light, the second wavelength corresponds to green light, and the third wavelength corresponds to blue light.

6. The camera system of claim 1, wherein the one or more processors are operable to:
send the control signals to the projector thereby causing the projector to project three separate instances of the pattern of electromagnetic radiation toward the target object at different times, a first instance of the pattern being at the first wavelength, a second instance being at the second wavelength, and a third instance being at the third wavelength; and
include three corresponding images in the image data, a first image corresponding to reflected electromagnetic radiation at the first wavelength, a second image corresponding to reflected electromagnetic radiation at the second wavelength, and a third image corresponding to reflected electromagnetic radiation at the third wavelength.

7. The camera system of claim 1, wherein the projector is operable to project the pattern of electromagnetic radiation toward the target object at each of the first, second and third wavelengths at a same time.

8. The camera system of claim 1, wherein the one or more processors is further operable to apply a refinement process to the 3D representation of the target object by:

reprojecting all points of the 3D representation of the target object back to the image data, determining a reprojection error, and utilizing the reprojection error as a cost function to refine each point of the 3D representation of the target object.

9. The camera system of claim 1, wherein the sensor is mono.

10. The camera system of claim 1, wherein the sensor is color.

11. An autonomous underwater vehicle (AUV) incorporating the camera system of claim 1.

12. A remotely operated vehicle (ROV) incorporating the camera system of claim 1.

13. A method comprising:
projecting a pattern of electromagnetic radiation toward a target object, the electromagnetic radiation comprising at least three different wavelengths including a first wavelength, a second wavelength, and a third wavelength;
receiving reflected electromagnetic radiation from the target object at a sensor;
storing a plurality of image data, the image data corresponding to the reflected electromagnetic radiation detected at each of the first, second, and third wavelengths;
processing the image data to compute a refractive normal according to a wavelength dispersion represented by differences in the image data at each of the first, second, and third wavelengths;
processing the image data to compute an interface distance corresponding to a distance from a center point of the sensor to a first refractive interface nearest the sensor according to the refractive normal;
generating a 3D representation of the target object by back projecting each pixel of the image data at the first, second, and third wavelengths in order to determine an object point location according to the refractive normal and interface distance; and
storing the 3D representation of the target object in a storage device.

14. The method of claim 13, wherein the electromagnetic radiation has wavelengths within 400-700 nanometers.

15. The method of claim 13, wherein each of the first wavelength, second wavelength, and third wavelength are separated by at least 100 nanometers.

16. The method of claim 13, further comprising projecting the pattern of electromagnetic radiation toward the target object utilizing at least three light emitting diodes each respectively emitting one of the first, second, and third wavelengths of electromagnetic radiation.

17. The method of claim 13, wherein the first wavelength corresponds to red light, the second wavelength corresponds to green light, and the third wavelength corresponds to blue light.

18. The method of claim 13, further comprising
projecting three separate instances of the pattern of electromagnetic radiation toward the target object at different times, a first instance of the pattern being at the first wavelength, a second instance being at the second wavelength, and a third instance being at the third wavelength; and
including three corresponding images in the image data, a first image corresponding to reflected electromagnetic radiation at the first wavelength, a second image corresponding to reflected electromagnetic radiation at the second wavelength, and a third image corresponding to reflected electromagnetic radiation at the third wavelength.

19. The method of claim 13, further comprising projecting the pattern of electromagnetic radiation toward the target object at each of the first, second and third wavelengths at a same time.

20. The method of claim 13, further comprising applying a refinement process to the 3D representation of the target object by:
reprojecting all points of the 3D representation of the target object back to the image data,
determining a reprojection error, and
utilizing the reprojection error as a cost function to refine each point of the 3D representation of the target object.

* * * * *